(12) United States Patent
Nangia et al.

(10) Patent No.: US 10,791,012 B2
(45) Date of Patent: Sep. 29, 2020

(54) FLEXIBLE RADIO RESOURCE ALLOCATION

(71) Applicant: Motorola Mobility LLC, Chicago, IL (US)

(72) Inventors: Vijay Nangia, Woodridge, IL (US); Robert Tristan Love, Barrington, IL (US); Ravi Kuchibhotla, Clarendon Hills, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 97 days.

(21) Appl. No.: 15/721,255

(22) Filed: Sep. 29, 2017

(65) Prior Publication Data
US 2018/0097673 A1    Apr. 5, 2018

Related U.S. Application Data

(60) Provisional application No. 62/403,022, filed on Sep. 30, 2016.

(51) Int. Cl.
*H04L 27/26* (2006.01)
*H04L 5/00* (2006.01)
*H04W 72/04* (2009.01)

(52) U.S. Cl.
CPC ......... *H04L 27/2613* (2013.01); *H04L 5/001* (2013.01); *H04L 5/0053* (2013.01); *H04L 5/0064* (2013.01); *H04L 5/0087* (2013.01); *H04L 5/0094* (2013.01); *H04W 72/044* (2013.01); *H04W 72/0413* (2013.01);
(Continued)

(58) Field of Classification Search
None
See application file for complete search history.

(56) References Cited

U.S. PATENT DOCUMENTS 9,860,099 B1  1/2018 Noh et al.
2009/0274174 A1* 11/2009 Hwang ............. H04W 72/0406
                                            370/480
(Continued)

FOREIGN PATENT DOCUMENTS

EP         3282623 A1    8/2016

OTHER PUBLICATIONS

CATT, "Discussion of NR Numerology", 3GPP TSG RAN WG1 Meeting #86, R1-166471, Aug. 22-26, 2016, pp. 1-5.
(Continued)

*Primary Examiner* — Chi H Pham
*Assistant Examiner* — Raul Rivas
(74) *Attorney, Agent, or Firm* — Kunzler Bean & Adamson

(57) ABSTRACT

For flexible radio resource allocation, a processor 405 monitors for a transmission control 150/155 in a given Orthogonal Frequency-Division Multiplexing (OFDM) symbol 10 of a first slot 11 based on a transmission control policy 290. The processor 405 further receives the transmission control 150/155 in the given OFDM symbol 10. The processor 405 determines available time frequency resources (TFR) 16 for a data transmission based on at least a symbol position 203 of the given OFDM symbol 10 and the transmission control policy 290, wherein the TFR 16 comprise at least one OFDM symbol 10 and at least one frequency range 15.

19 Claims, 39 Drawing Sheets

(52) U.S. Cl.
CPC ....... *H04W 72/0493* (2013.01); *H04L 5/0044* (2013.01); *H04L 5/0055* (2013.01); *H04L 5/0082* (2013.01)

(56) References Cited

U.S. PATENT DOCUMENTS

| | | | |
|---|---|---|---|
| 2012/0320782 | A1 | 12/2012 | Seo et al. |
| 2014/0293975 | A1* | 10/2014 | Kim ............... H04L 5/0053 370/336 |
| 2014/0301359 | A1* | 10/2014 | Seo ............... H04L 5/0007 370/330 |
| 2015/0288498 | A1* | 10/2015 | Kliger ............ H04L 12/2801 370/491 |
| 2016/0149670 | A1 | 5/2016 | Kim et al. |
| 2016/0352551 | A1 | 12/2016 | Zhang et al. |
| 2017/0244535 | A1* | 8/2017 | Islam ............. H04B 7/2615 |
| 2018/0097588 | A1 | 4/2018 | Nangia et al. |
| 2018/0139773 | A1 | 5/2018 | Ma et al. |
| 2018/0234227 | A1 | 8/2018 | Zhang et al. |
| 2018/0287750 | A1 | 10/2018 | Abdoli et al. |
| 2018/0302905 | A1 | 10/2018 | Fodor et al. |
| 2019/0149309 | A1 | 5/2019 | Kuang et al. |
| 2019/0174513 | A1 | 6/2019 | Loehr et al. |

OTHER PUBLICATIONS

Huawei et al., "WF on slot and time interval X", 3GPP TSG RAN WG1 #86, R1-168469, Aug. 22-26, 2016, pp. 1-6.

Huawei et al., "Synchronization and initial access mechanism in NR", 3GPP TSG RAN WG1 Meeting #86, R1-166107, Aug. 22-26, 2016, pp. 1-4.

INTEL Corporation, "Capability to support multiple numerologies", 3GPP TSG WG1 Meeting #86, R1-166554, Aug. 22-26, 2016, pp. 1-3.

Motorola Mobility, "Flexible frame structure and control signaling for NR", 3GPP TSG RAN WG1 #86bis, R1-1609919, Oct. 10-14, 2016, pp. 1-4.

Nokia et al., "On resource block grouping and multi-cell coordination aspects for mixed numerology support", 3GPP TSG-RAN WG1 #86, R1-167261, Aug. 22-26, 2016, pp. 1-10.

NTT DOCOMO, INC., "Way forward on time-domain structure", 3GPP TSG RAN WG1 Meeting #86, R1-168534, Aug. 22-26, 2016, pp. 1-5.

Sreadtrum Communication, "Discussion on numerology and frame structure", 3GPP TSG RAN WG1 Meeting #84 bis, R1-162549, Apr. 11-15, 2016, pp. 1-6.

PCT/US2017/054562, "Invitation to pay additional fees and, where applicable protest fee; Annex to Form PCT/ISA/206, Communication Relating to the Results of the Partial International Search", dated Jan. 25, 2018, pp. 1-18.

PCT/US2017/054572, "Notification of transmittal of the international search report and the written opinion of the international searching authority, or the declaration", dated Feb. 7, 2018, pp. 1-13.

PCT/US2017/054562, "Notification of transmittal of the international search report and the written opinion of the international searching authority, or the declaration", dated Jun. 7, 2018, pp. 1-23.

USPTO, "Office Action Summary" U.S. Appl. No. 15/721,323, dated Aug. 7, 2019, pp. 1-11.

USPTO, "Office Action Summary" U.S. Appl. No. 15/721,323, dated Jan. 30, 2019, pp. 1-20.

\* cited by examiner

200

| TFR Number |
| --- |
| 201 |
| Symbol Position |
| 203 |
| Slot Type Indicator |
| 205 |

| Starting Slot Indicator |
| --- |
| 211 |
| Reserved Resources Marker |
| 195 |
| Reserved Resources BitMap |
| 213 |

FIG. 1G

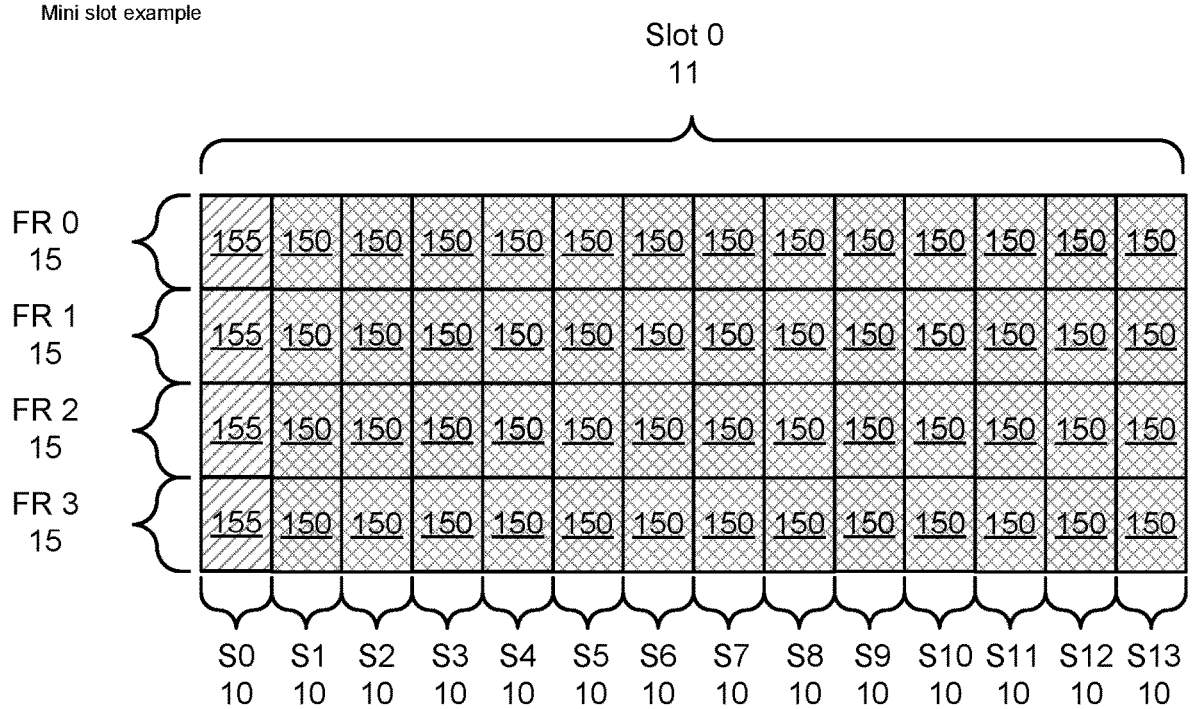
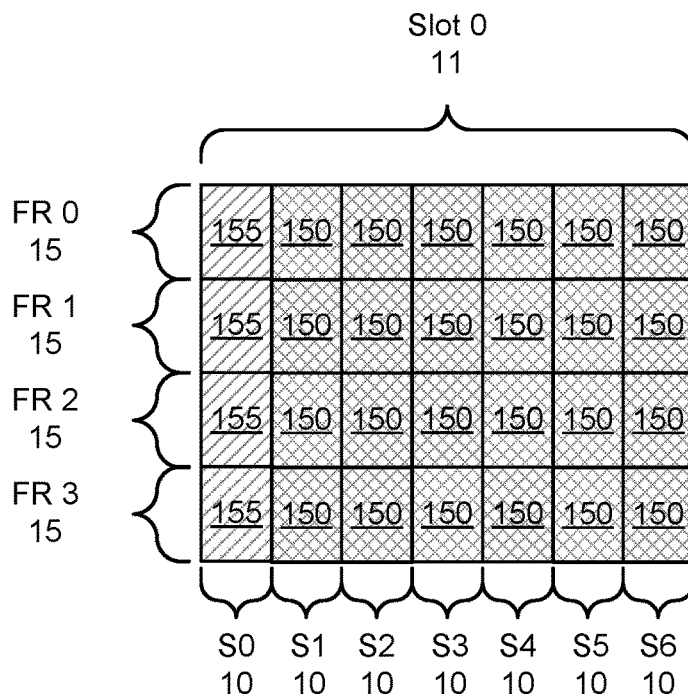
Fig. 2A

Alternate Embodiment

Fig. 2E

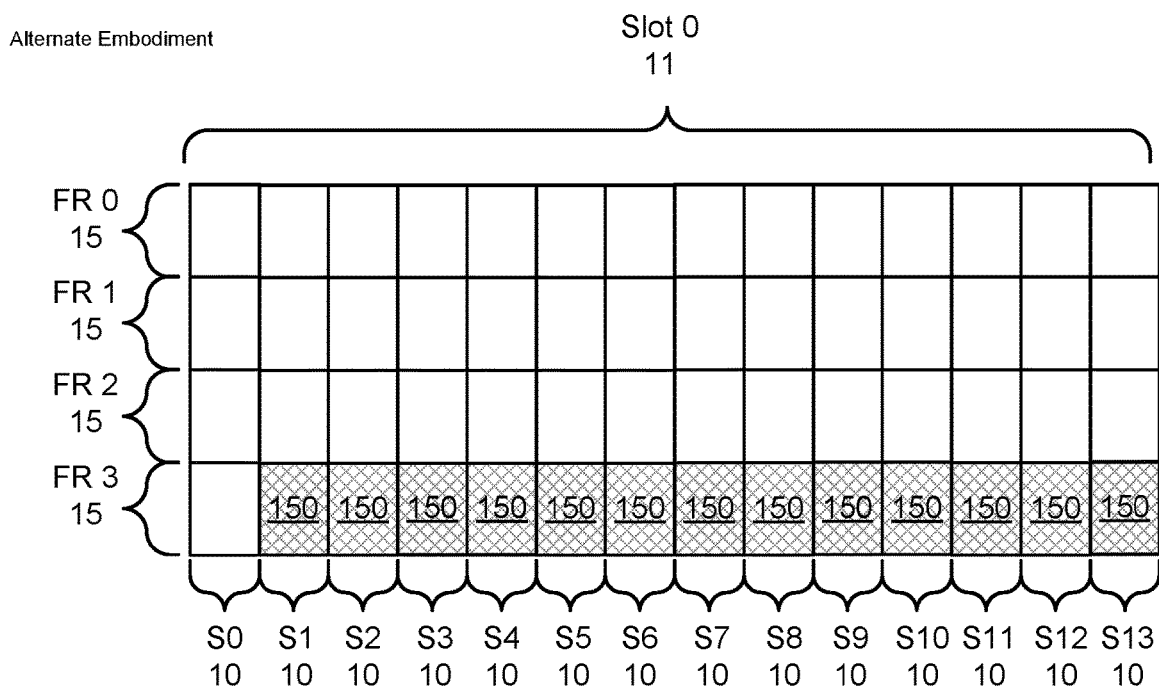
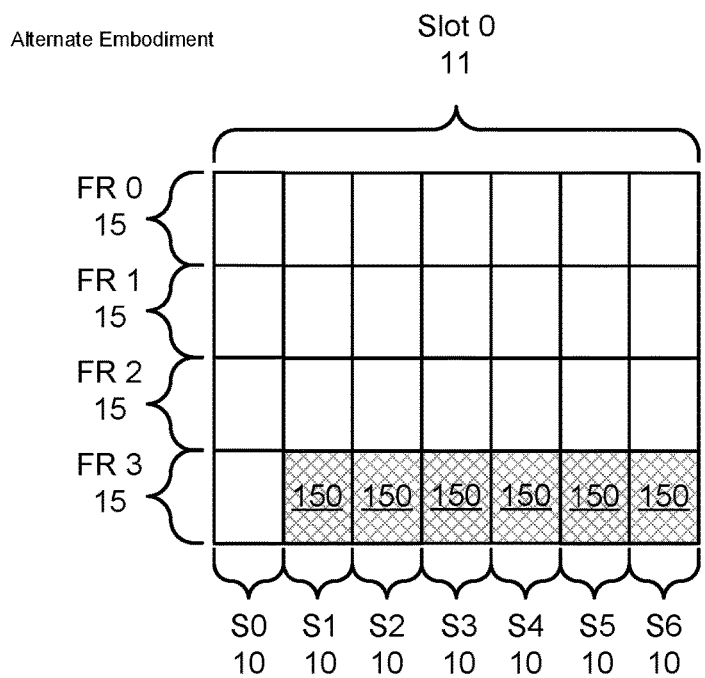
Fig. 2F

Alternate Embodiment
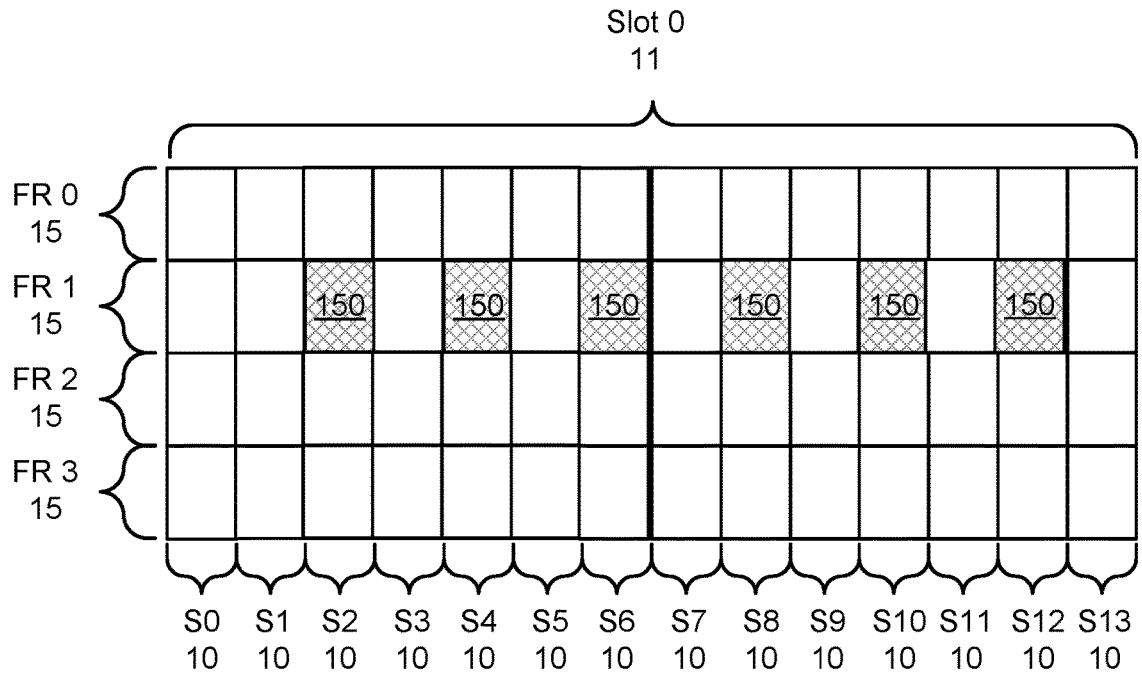
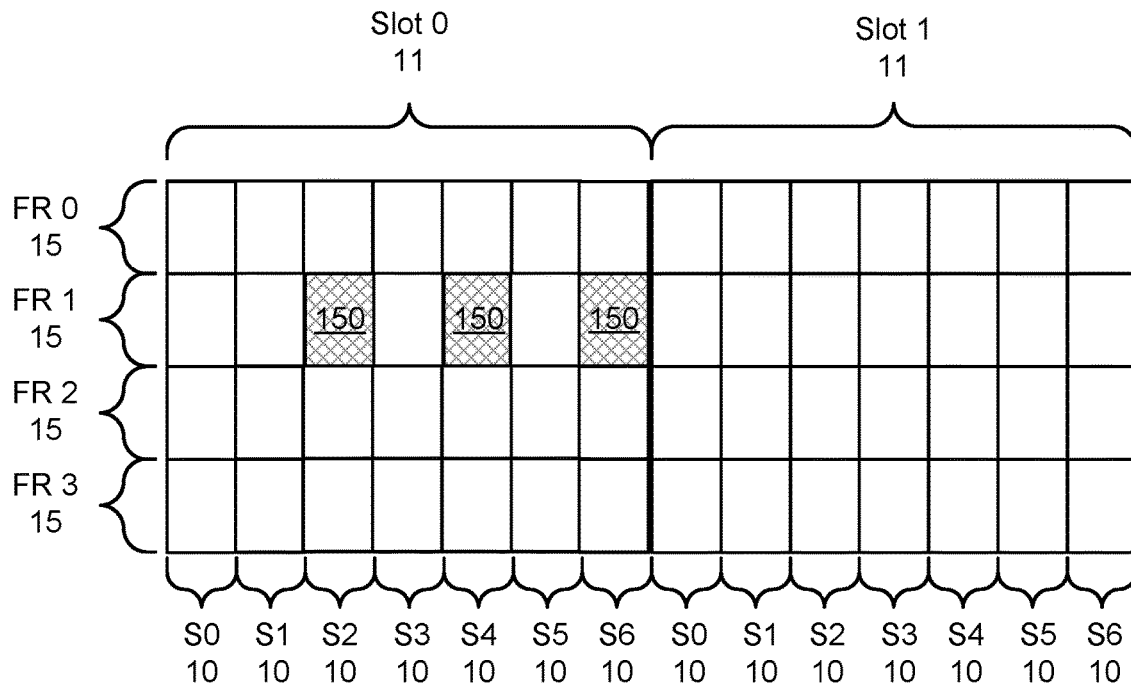
Fig. 2G

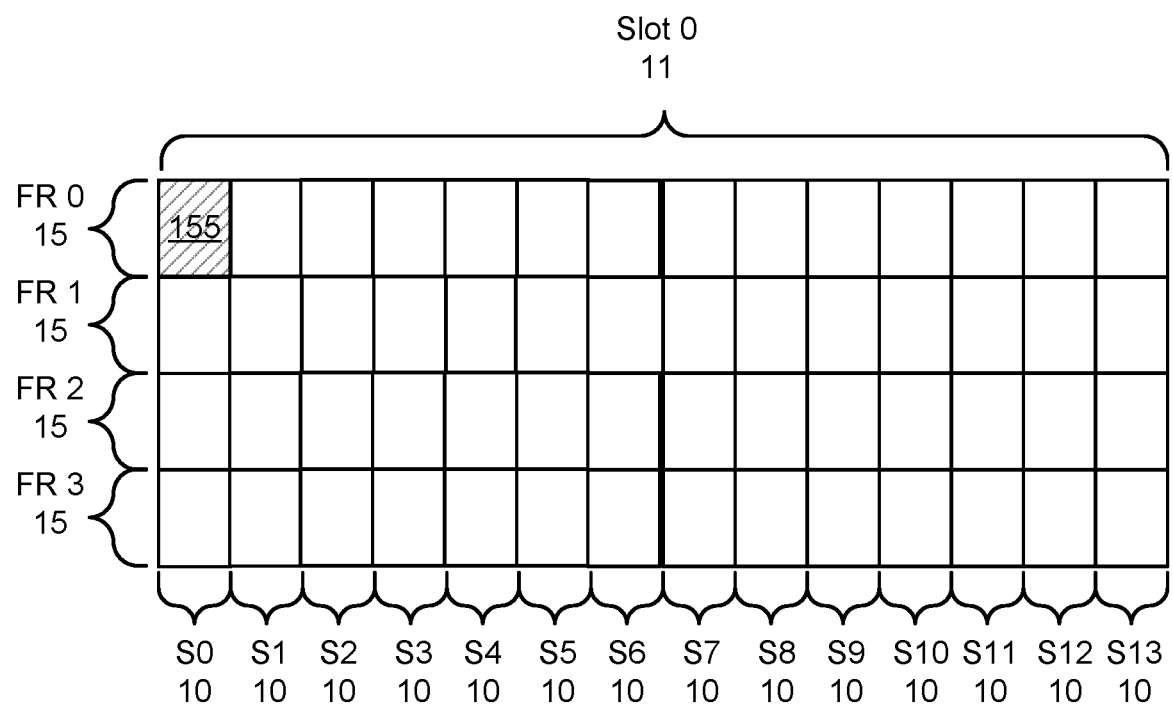
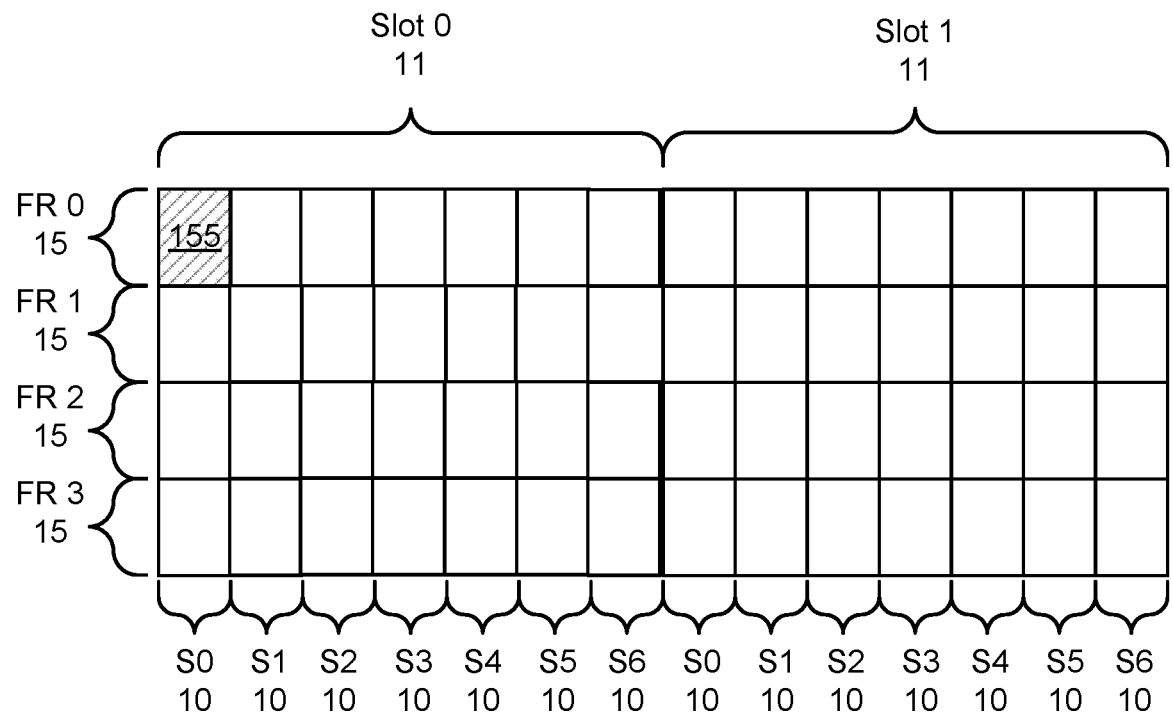
Fig. 2H

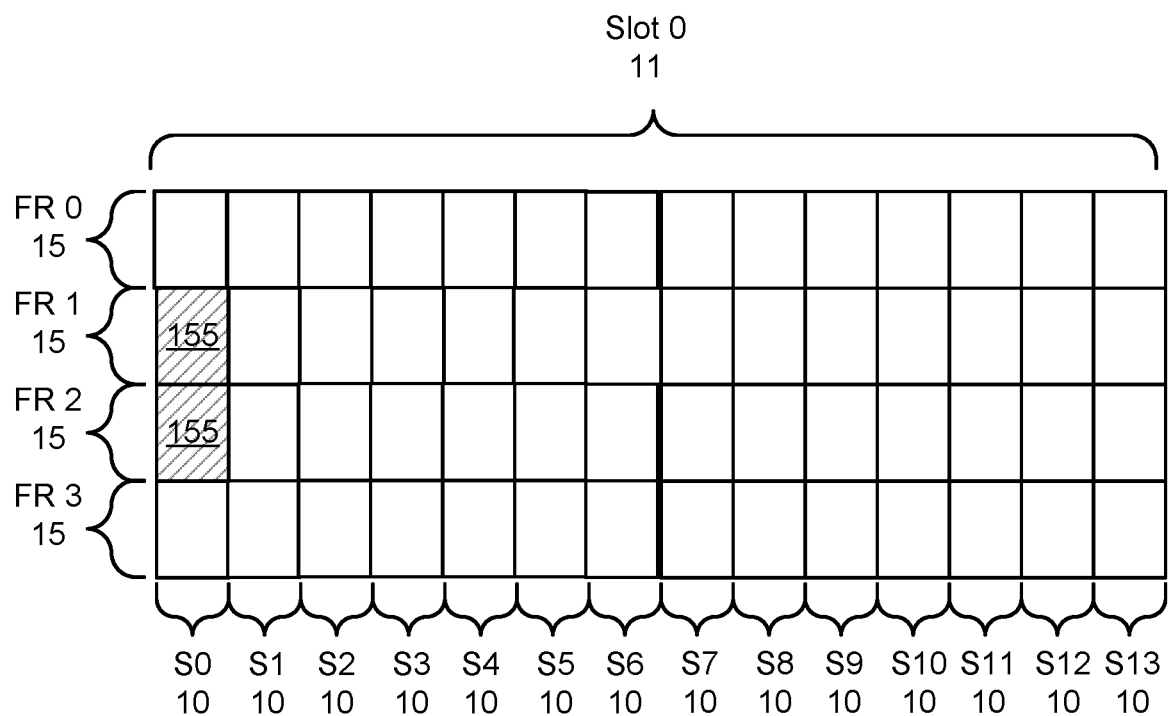
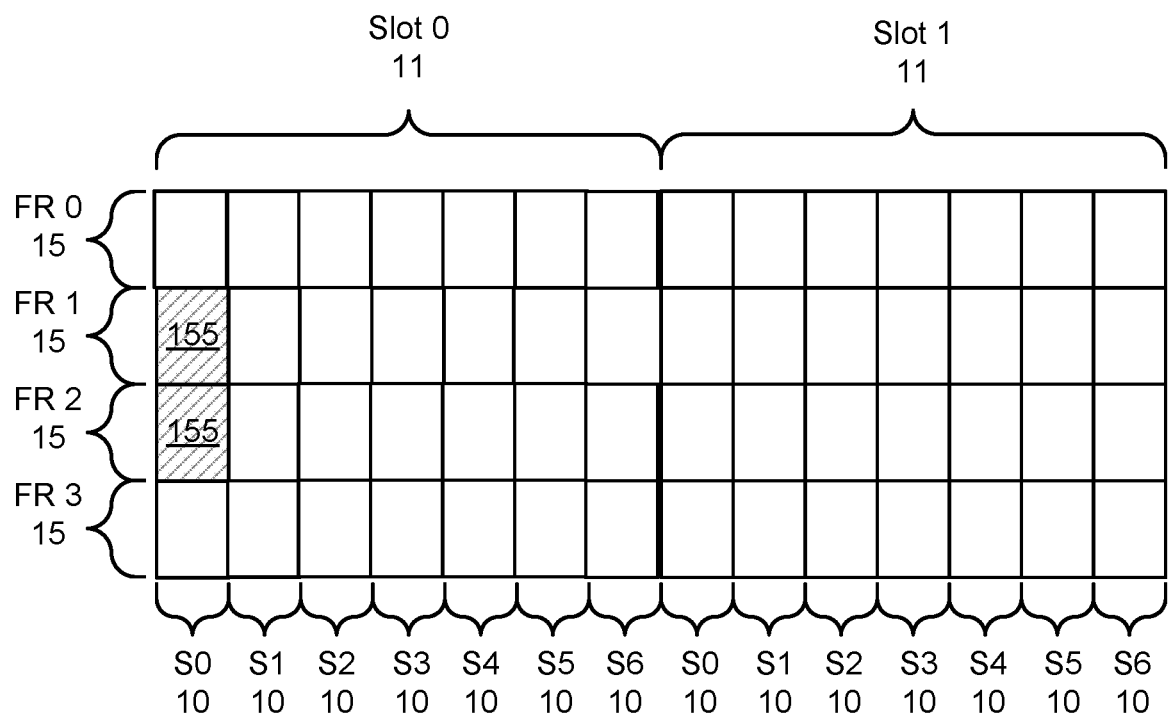
Fig. 2I

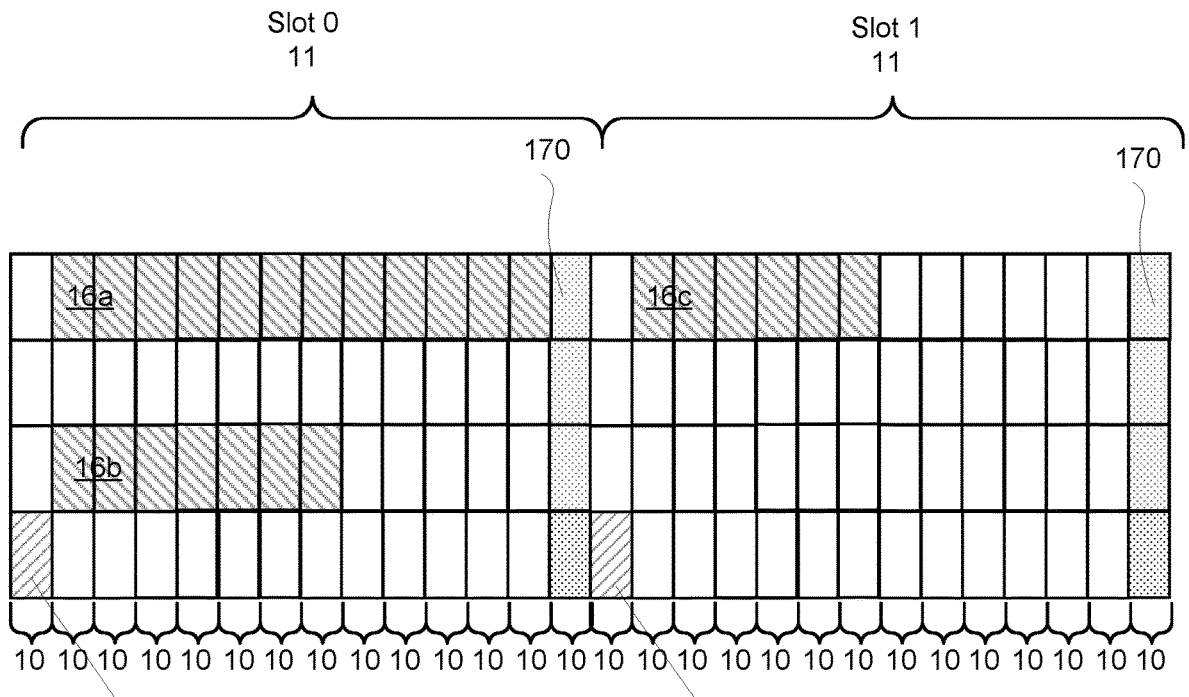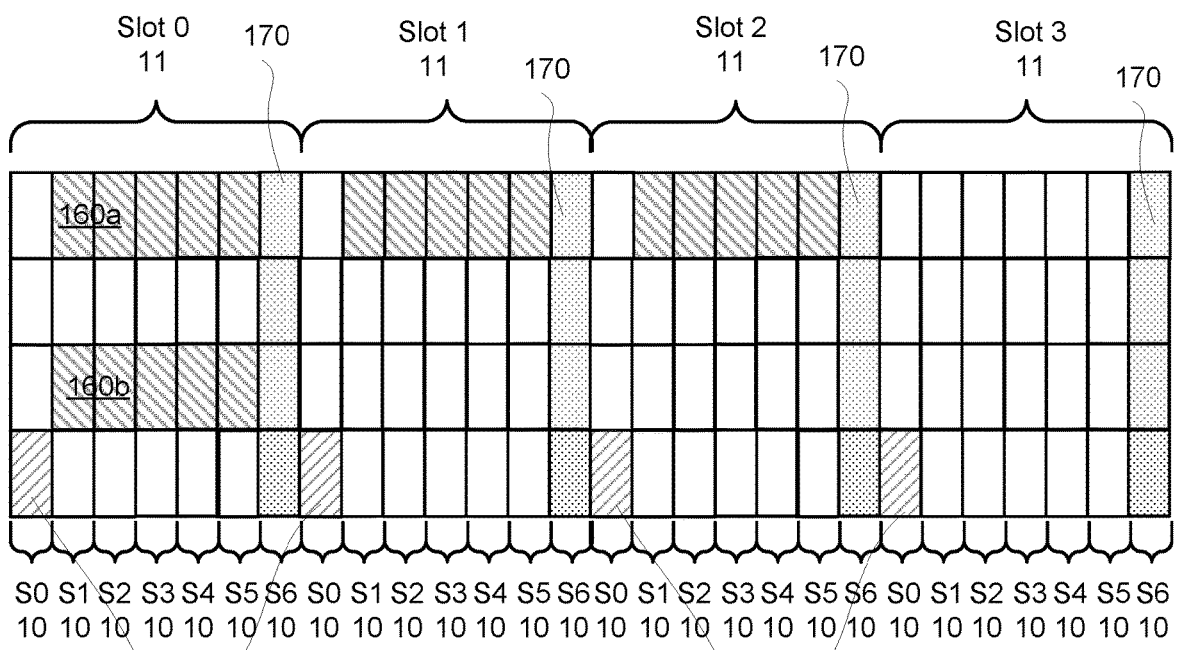
Fig. 5A

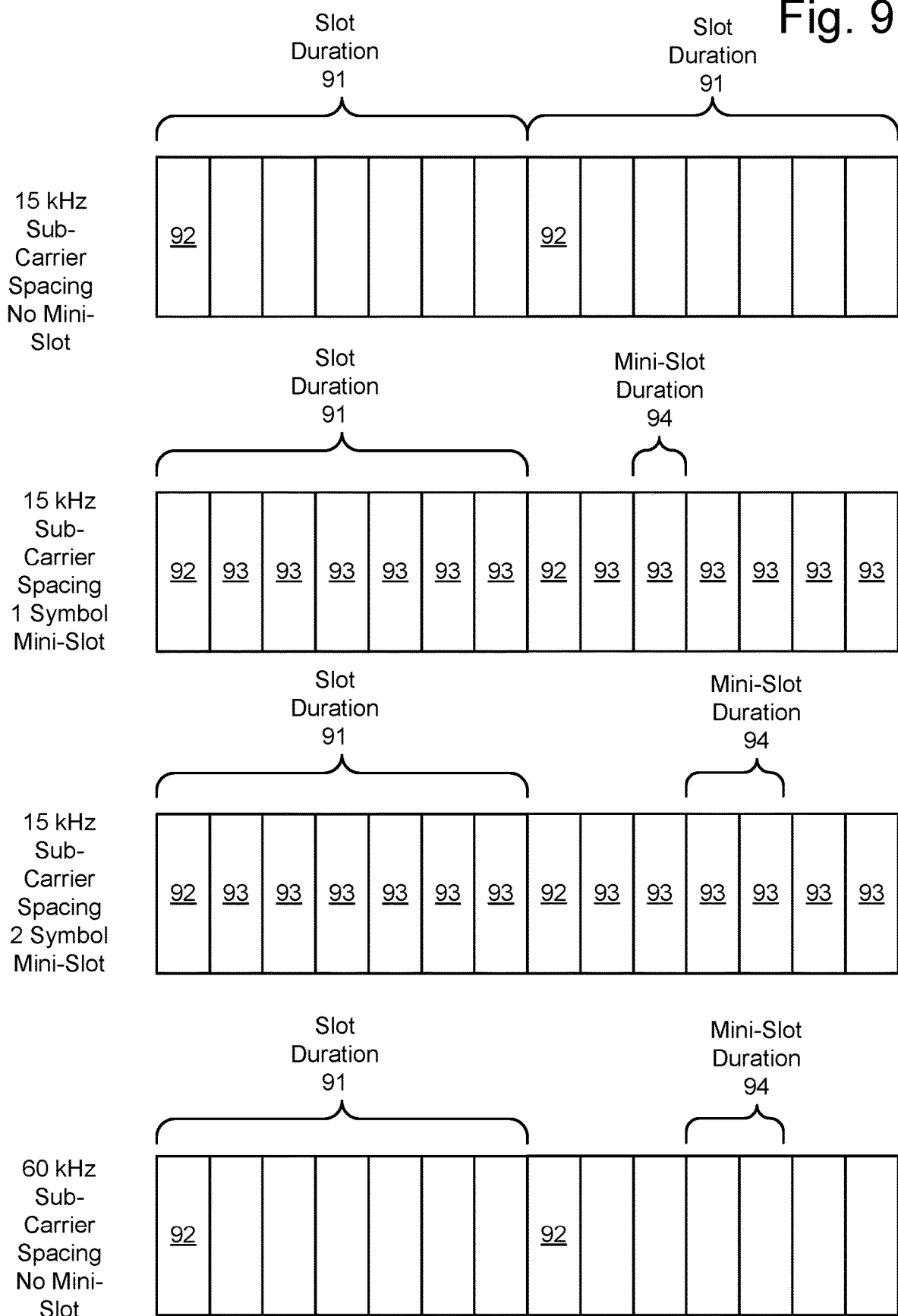

FLEXIBLE RADIO RESOURCE ALLOCATION

CROSS-REFERENCE TO RELATED APPLICATIONS

This application claims priority to U.S. Provisional Patent Application 62/403,022 entitled "FLEXIBLE RADIO RESOURCE ALLOCATION METHODS" and filed on Sep. 30, 2016 for Robert Love, which is incorporated herein by reference.

FIELD

The subject matter disclosed herein relates to resource allocation and more particularly relates to flexible radio resource allocation.

BACKGROUND

Description of the Related Art

Long Term Evolution (LTE) and other wireless communication standards may subdivide transmissions to efficient use available bandwidth.

BRIEF SUMMARY

A method for flexible radio resource allocation is disclosed. The method monitors, by use of a processor, for a transmission control in a given Orthogonal Frequency-Division Multiplexing (OFDM) symbol of a first slot based on a transmission control policy. The method further receives the transmission control in the given OFDM symbol. The method determines available time frequency resources (TFR) for a data transmission based on at least a symbol position of the given OFDM symbol and the transmission control policy, wherein the TFR comprise at least one OFDM symbol and at least one frequency range. The method communicates the data transmission in the TFR. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1F is a schematic block diagram illustrating one embodiment of time frequency resources data;

FIG. 1G is a schematic block diagram illustrating one embodiment of a transmission control;

FIG. 2A is a schematic diagram illustrating one embodiment of transmission controls within slots;

FIG. 2B is a schematic diagram illustrating one alternate embodiment of transmission controls within slots;

FIG. 2C is a schematic diagram illustrating one alternate embodiment of transmission controls within slots;

FIG. 2D is a schematic diagram illustrating one alternate embodiment of transmission controls within slots;

FIG. 2E is a schematic diagram illustrating one alternate embodiment of transmission controls within slots;

FIG. 2F is a schematic diagram illustrating one embodiment of transmission controls within slots;

FIG. 2G is a schematic diagram illustrating one alternate embodiment of transmission controls within slots;

FIG. 2H is a schematic diagram illustrating one alternate embodiment of transmission controls within slots;

FIG. 2I is a schematic diagram illustrating one alternate embodiment of transmission controls within slots;

FIG. 5A is a schematic diagram illustrating one embodiment of a resource marker;

FIG. 9 is a schematic diagram illustrating one embodiment of slots;

DETAILED DESCRIPTION

Figure 1A:
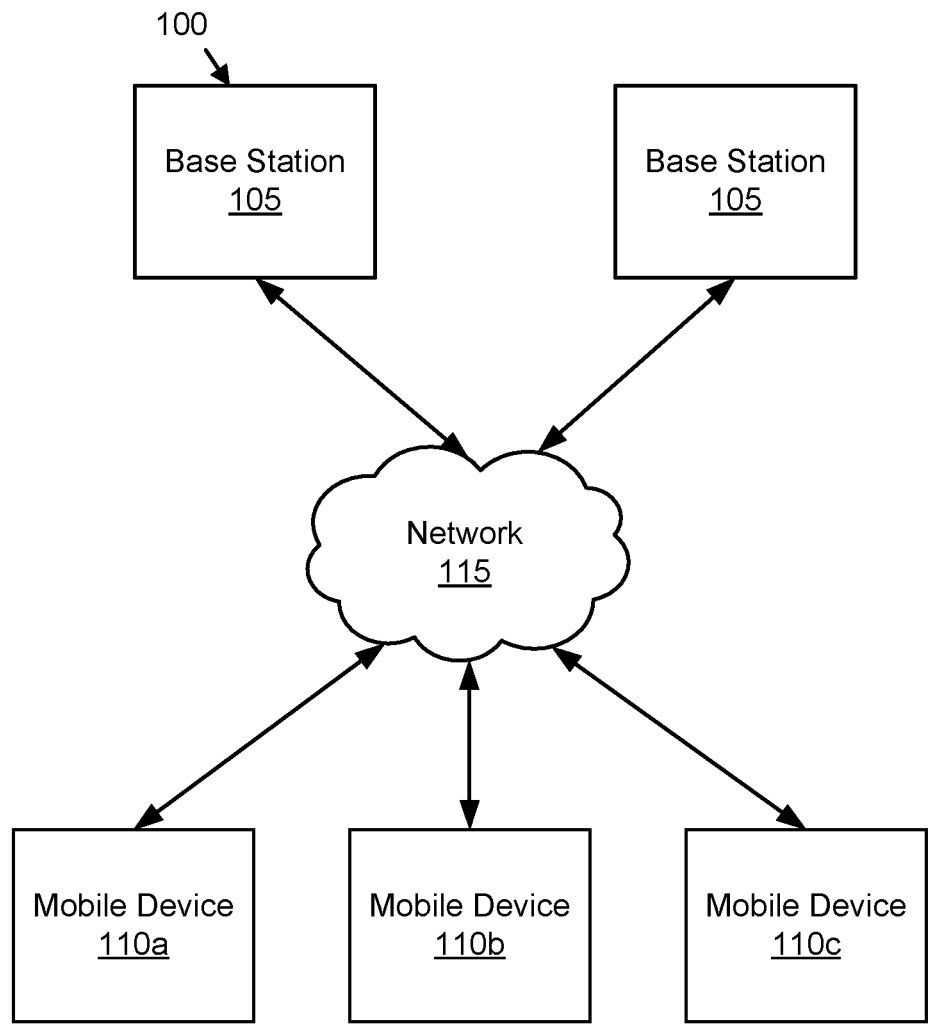
FIG. 1A is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a communication system 100. The system 100 includes one or more base stations 120 and one or more mobile devices 110. The mobile devices 110 may communicate with the base stations 120. A base station 120 may be a gNodeB (gNB) base station 120, i.e. New Radio (NR) base station 120, or an enhanced evolved node B (eNB) Long Term Evolution (LTE) base station 120. The mobile device 110 may be a mobile telephone, a machine-type communications (MTC) device, a tablet computer, a laptop computer, and embedded communication devices in automobiles, kiosks, appliances, and the like.

The system 100 may communicate a downlink control to specify the available time frequency resources (TFR) for a downlink data transmission to the mobile device 110. In addition, the system 100 may communicate an uplink control to specify the available time frequency resources (TFR) for an uplink data transmission to a base station 120. The downlink control and the uplink control are collectively referred to hereafter as a transmission control. The embodiments described herein determine the available TFR based in part on a position of an Orthogonal Frequency-Division Multiplexing (OFDM) symbol as will be described hereafter. OFDM in general comprises regular OFDM, pre-coded OFDM such as DFT-spread OFDM (DFT-SOFDM), or Single-carrier FDM (SC-FDM). In addition, the system 100 may configure subcarriers for communications between the base stations 120 and the mobile devices 110 as will be described hereafter.

Figure 1B:
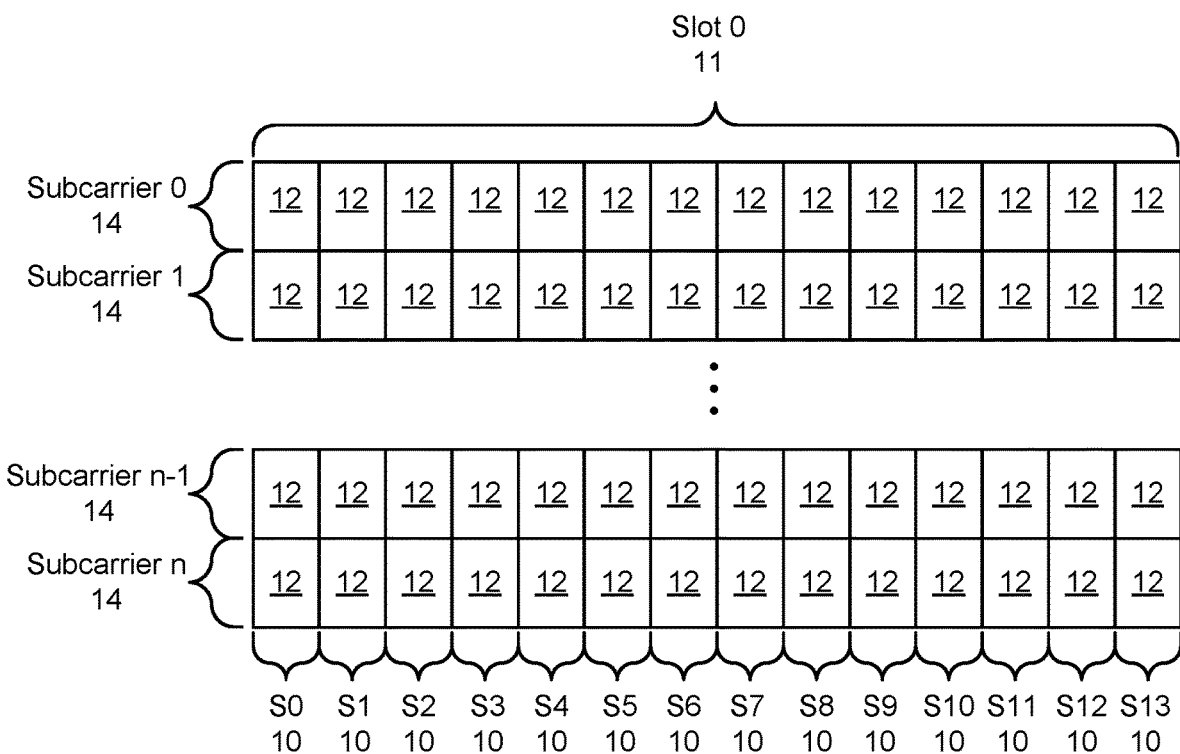
FIG. 1B is a schematic block diagram illustrating one embodiment of a 14-symbol slot.

FIG. 1B is a schematic block diagram illustrating one embodiment of a 14-symbol slot 11. The slot 11 is a time- and frequency-based unit of communication between the base stations 120 and the mobile devices 110. In the depicted embodiment, the slot 11 includes 14 time-based OFDM symbols 10 and a plurality of frequency-based subcarriers 14 for each OFDM symbol 10. Each combination of a sub carrier 14 and an OFDM symbol 10 forms a resource element 12.

Figure 1C:
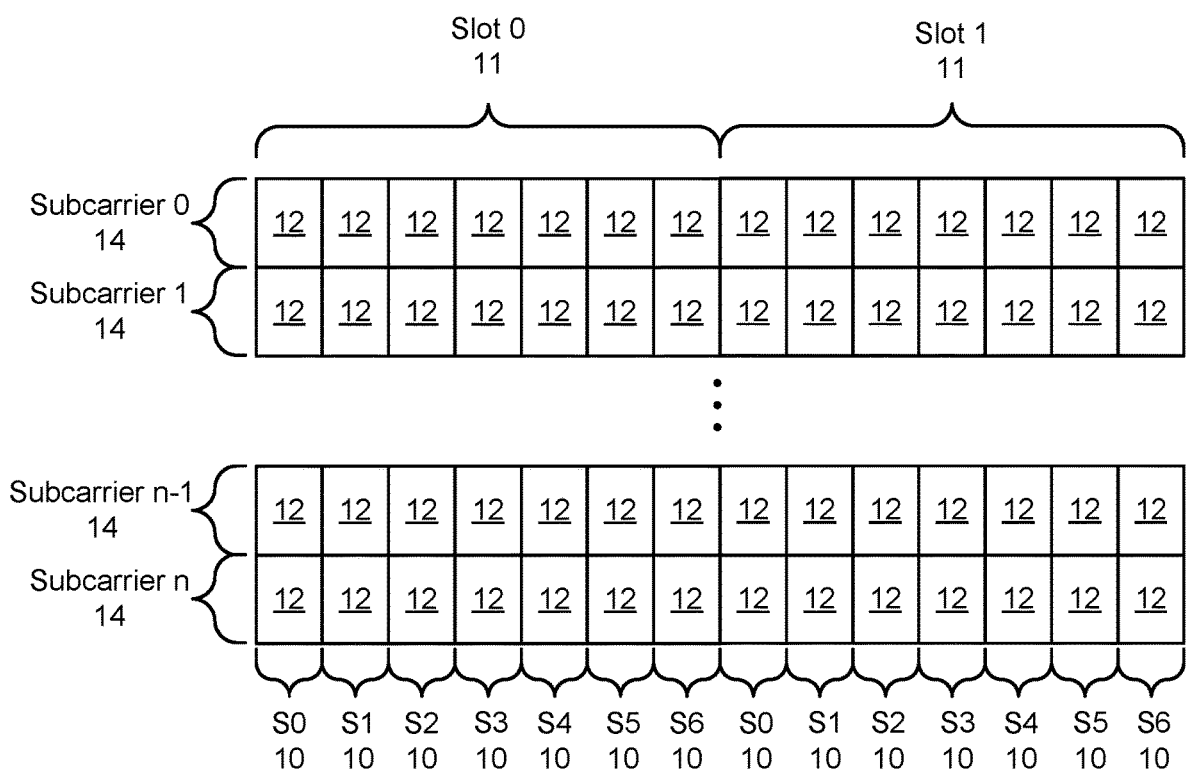
FIG. 1C is a schematic block diagram illustrating one embodiment of seven-symbol slots.

FIG. 1C is a schematic block diagram illustrating one embodiment of seven-symbol slots 11. In the depicted embodiment, two slots 11 are shown. Each slot 11 includes seven OFDM symbols 10. Each combination of a sub carrier 14 and an OFDM symbol 10 forms a resource element 12.

Figure 1D:
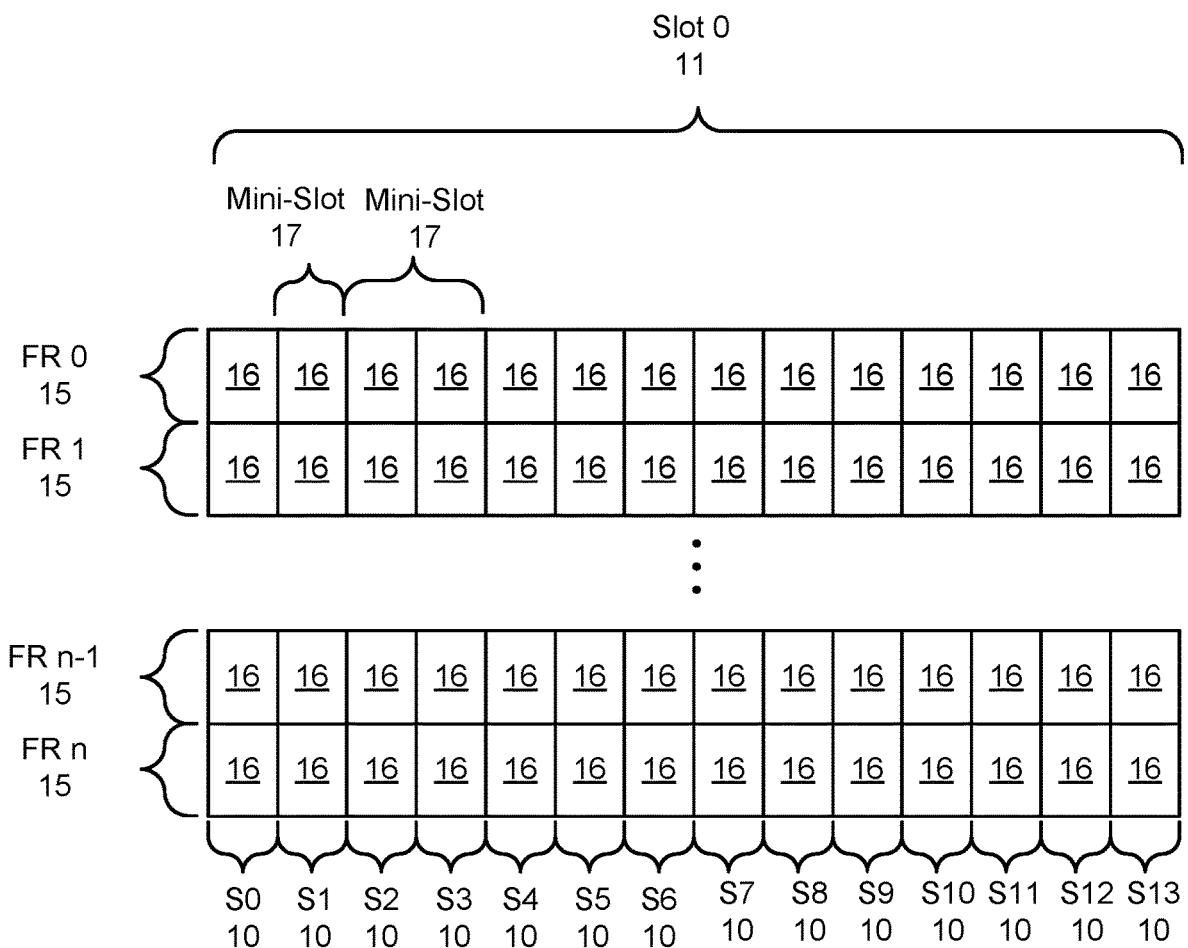
FIG. 1D is a schematic block diagram illustrating one embodiment of a 14-symbol slot.

FIG. 1D is a schematic block diagram illustrating one embodiment of a 14-symbol slot 11. In the depicted embodiment, the frequencies of each OFDM symbol 10 is divided into a plurality of frequency ranges or frequency resources (FR) A frequency range or resource comprises a plurality of subcarriers, with different frequency ranges having the same or different number of subcarriers. 15. Each combination of an OFDM symbol 10 and a frequency range 15 forms a TFR 16.

The slot 11 may include one or more mini-slots 17. Each mini-slots 17 may include one or more OFDM symbols 10, including each frequency range 15 for each OFDM symbol 10. In the depicted embodiment, one and two OFDM symbol mini-slots 17 are shown. A mini-slot 17 in a 14-symbol slot 11 may comprise from 1 to 13 OFDM symbols 10.

Figure 1E:
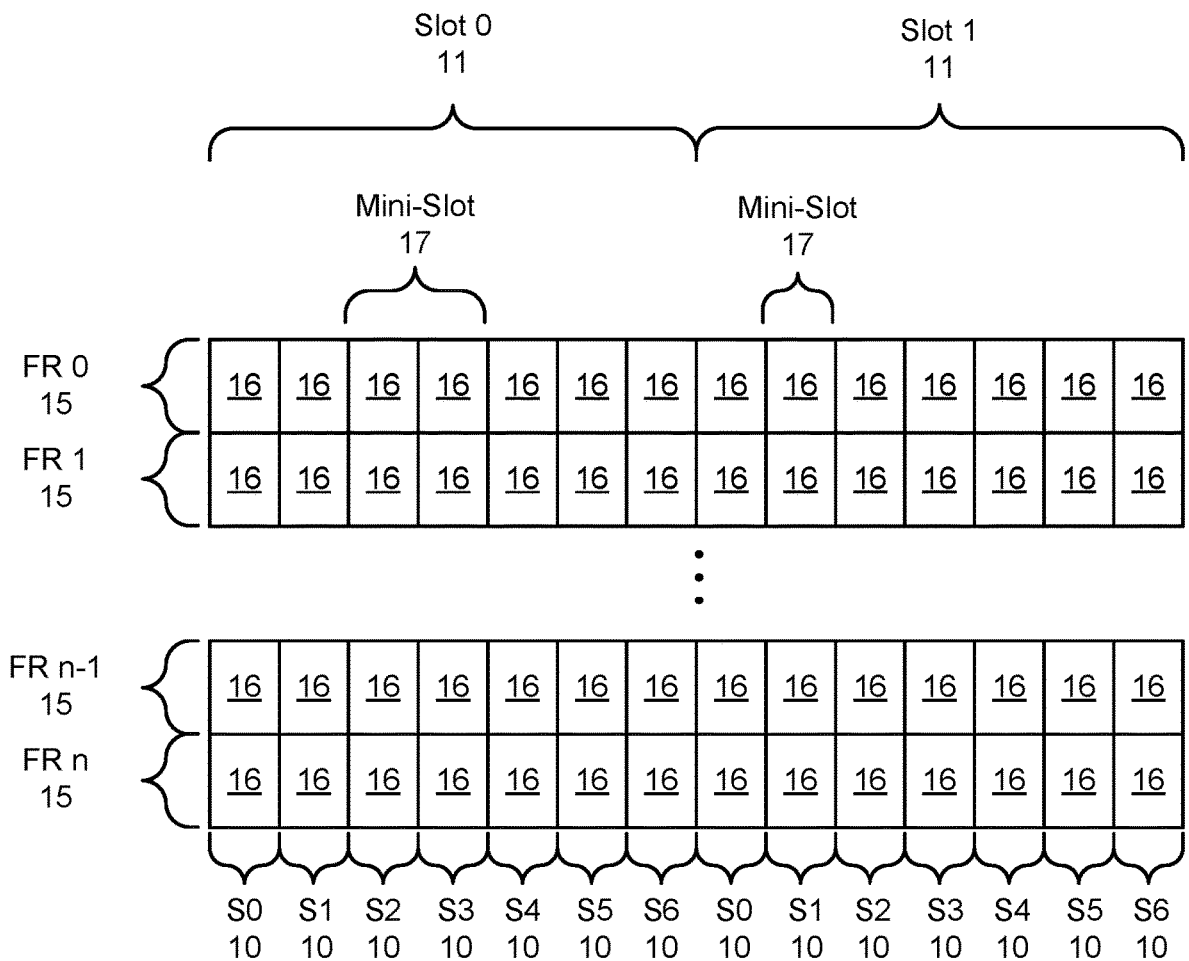
FIG. 1E is a schematic block diagram illustrating one embodiment of seven-symbol slots.

FIG. 1E is a schematic block diagram illustrating one embodiment of seven-symbol slots 11. In the depicted embodiment, two slots 11 with mini-slots 17 are shown. The mini-slots 17 include one or more OFDM symbols 10, including each frequency range 15 for each OFDM symbol 10. In the depicted embodiment, one and two OFDM symbol mini-slots 17 are shown. A mini-slot 17 in a seven-symbol slot 11 may comprise from 1 to 6 OFDM symbols 10.

FIG. 1F is a schematic block diagram illustrating one embodiment of TFR data 200. The TFR data 200 may describe an available TFR 16. The TFR data 200 maybe organized as a data structure in a memory and/or encoded for transmission. In the depicted embodiment, the TFR data 200 includes a TFR number 201, a symbol position 203, and a slot type indicator 205. The TFR number 201 may specify a number of TFR 16 in a data transmission. In one embodiment, the TFR number 201 is greater than one. The symbol position 203 may indicate a position of a given OFDM symbol 10 that includes a transmission control. The slot type indicator 205 may determine whether a transmission control is a slot transmission control or a mini-slot transmission control.

FIG. 1G is a schematic block diagram illustrating one embodiment of a transmission control 150/155. The transmission control 150/155 may be one of a slot transmission control 155 and a mini-slot transmission control 150. The transmission control 150/155 maybe organized as a data structure in a memory and/or encoded for transmission. In the depicted embodiment, the transmission control 150/155 includes the starting slot indicator 211, a reserved resources marker 195, and a reserved resources bitmap 213. The starting slot indicator 211 may specify an initial slot 11 for a data transmission. The reserved resources marker 195 may indicate a reserved OFDM symbol 10. In one embodiment, a mobile device 110 is prevented from receiving or transmitting data in the reserved OFDM symbol 10. The reserved resources bitmap 213 may specify which slots 11 have a reserved OFDM symbol 10. In addition, the reserved resources bitmap 213 may have a bit set for each reserved OFDM symbol in one or more slots 11.

Figure 1H:
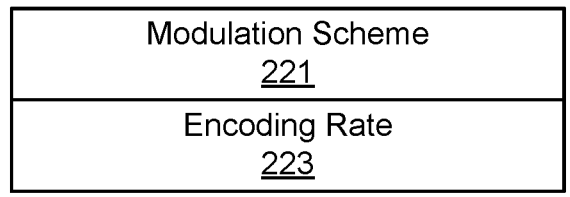
FIG. 1H is a schematic block diagram illustrating one embodiment of a modulation encoding scheme index.

FIG. 1H is a schematic block diagram illustrating one embodiment of a modulation encoding scheme index 220. The modulation encoding scheme index 220 maybe organized as a data structure and/or encoded for transmission. In the depicted embodiment, the modulation encoding scheme 220 includes a modulation scheme 221 and an encoding rate 223. The modulation scheme 221 may specify the QAM modulation order to use for the resource allocated in frequency ranges 15 and/or subcarriers 14 for each slot 11, OFDM symbols 10 of a slot 11, and/or frequency ranges 15 with a slot 11. The encoding rate 223 may specify the rate at which TFR 16 are encoded. The modulation scheme 221 and the encoding rate 223 may be jointly encoded. The transport block size on the allocated TFR 16 may be determined based on the modulation scheme 221 and the encoding rate 223.

Figure 1I:
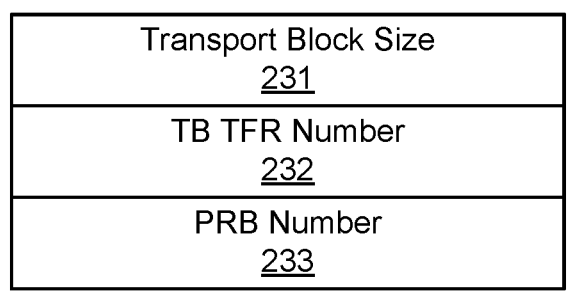
FIG. 1I is a schematic block diagram illustrating one embodiment of a transport block index.

FIG. 1I is a schematic block diagram illustrating one embodiment of a transport block index 230. The transport block index 230 may be organized as a data structure in a memory and/or encoded for transmission. In the depicted embodiment, the transport block index 230 includes a transport block size 231, a TB TFR number 232, and a physical resource Block (PRB) number 233. The transport block size 231 may indicate a size of a transport block in a data transmission. The TB TFR number 232 may specify a number of TFR 16 in the time-domain in a data transmission. The PRB number 233 may specify a number of PRB in the data transmission.

Figure 1J:
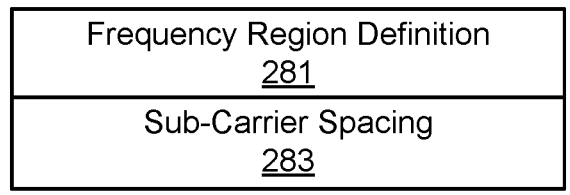
FIG. 1J is a schematic block diagram illustrating one embodiment of a numerology scheme.

FIG. 1J is a schematic block diagram illustrating one embodiment of a numerology scheme 280. The numerology scheme 280 maybe organized as a data structure in a memory and/or encoded for transmission. In the depicted embodiment, the numerology scheme 280 includes a frequency region definition 281 and a subcarrier spacing 283. The frequency range definition 281 may define one or more frequency ranges 15. The subcarrier spacing 283 may specify a spacing between subcarriers 14 for one or more frequency regions 15.

Figure 1K:
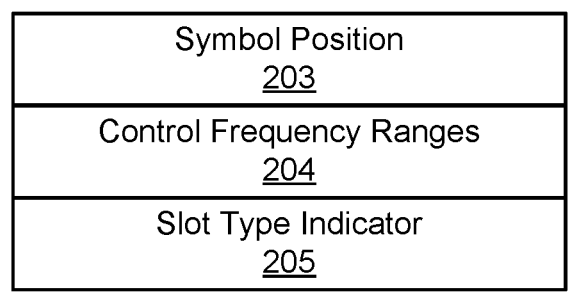
FIG. 1K is a schematic block diagram illustrating one embodiment of a transmission control policy.

FIG. 1K is a schematic block diagram illustrating one embodiment of a transmission control policy 290. The transmission control policy 290 maybe organized as a data structure in a memory and/or encoded for transmission. In the depicted embodiment, the transmission control policy 290 includes the symbol position 203, control frequency ranges 204, and the slot type indicator 205. The control frequency ranges 204 may specify one or more frequency ranges 15 that include the transmission control 150/155.

FIG. 2A is a schematic diagram illustrating one embodiment of transmission controls 150/155 within slots 11. In the depicted embodiment, 14-symbol slots 11 and seven-symbol slots 11 are shown. The transmission policy 290 may specify that the symbol position 203 of a given OFDM symbol 10 that includes the transmission control 150/155 is OFDM symbol 0 10 for a slot transmission control 155 in the 14-symbol slot 11 and the seven-symbol slot 11. The symbol position 203 may be of one or more of OFDM symbols 1-13 10 for a 14-symbol mini-slot transmission control 150 in the 14-symbol slot 11. The symbol position 203 may be one or more of OFDM symbols 1-6 10 for a seven-symbol mini-slot transmission control 150 of the seven-symbol slot 11.

In one embodiment, the given OFDM symbol 10 comprises a mini-slot transmission control 150 and 0 to 12 immediately subsequent OFDM symbols 10 comprise a mini-slot 17 for a 14-symbol slot 11. In addition, the given OFDM symbol 10 may comprise a mini-slot transmission control 150 and 0 to 5 immediately subsequent OFDM symbols 10 comprise a mini-slot 17 for a seven-symbol slot 11.

Figure 2B:
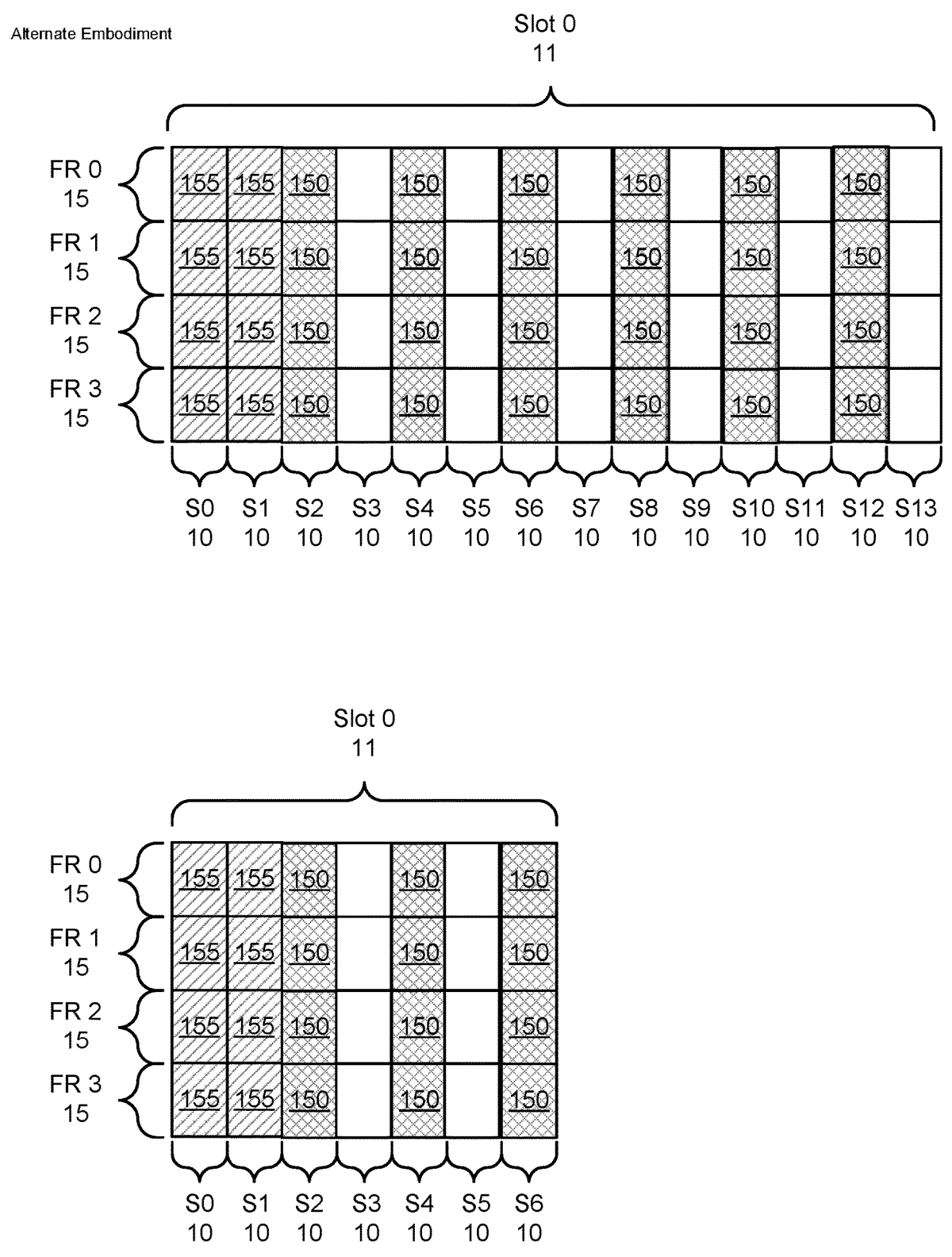

FIG. 2B is a schematic diagram illustrating one alternate embodiment of transmission controls 150/155 within slots 11. In the depicted embodiment, 14-symbol slots 11 and seven-symbol slots 11 are shown. The transmission policy 290 may specify that the symbol position 203 of a given OFDM symbol 10 that includes the transmission control 150/155 is OFDM symbols 0-1 10 for a slot transmission control 155 in the 14-symbol slot 11 and the seven-symbol slot 11. The symbol position 203 of the given OFDM symbol 10 may be selected from the group of consisting of OFDM symbol 2 10, OFDM symbol 4 10, OFDM symbol 6 10, OFDM symbol 8 10, OFDM symbol 10 10, and OFDM symbol 12 10 for a 14-symbol mini-slot transmission control 150 in the 14-symbol slot 11. The symbol position 203 of the given OFDM symbol may be selected from the group of consisting of OFDM symbol 2 10, OFDM symbol 4 10, and OFDM symbol 6 10 for a seven-symbol mini-slot transmission control 150 in the seven-symbol slot 11.

Figure 2C:
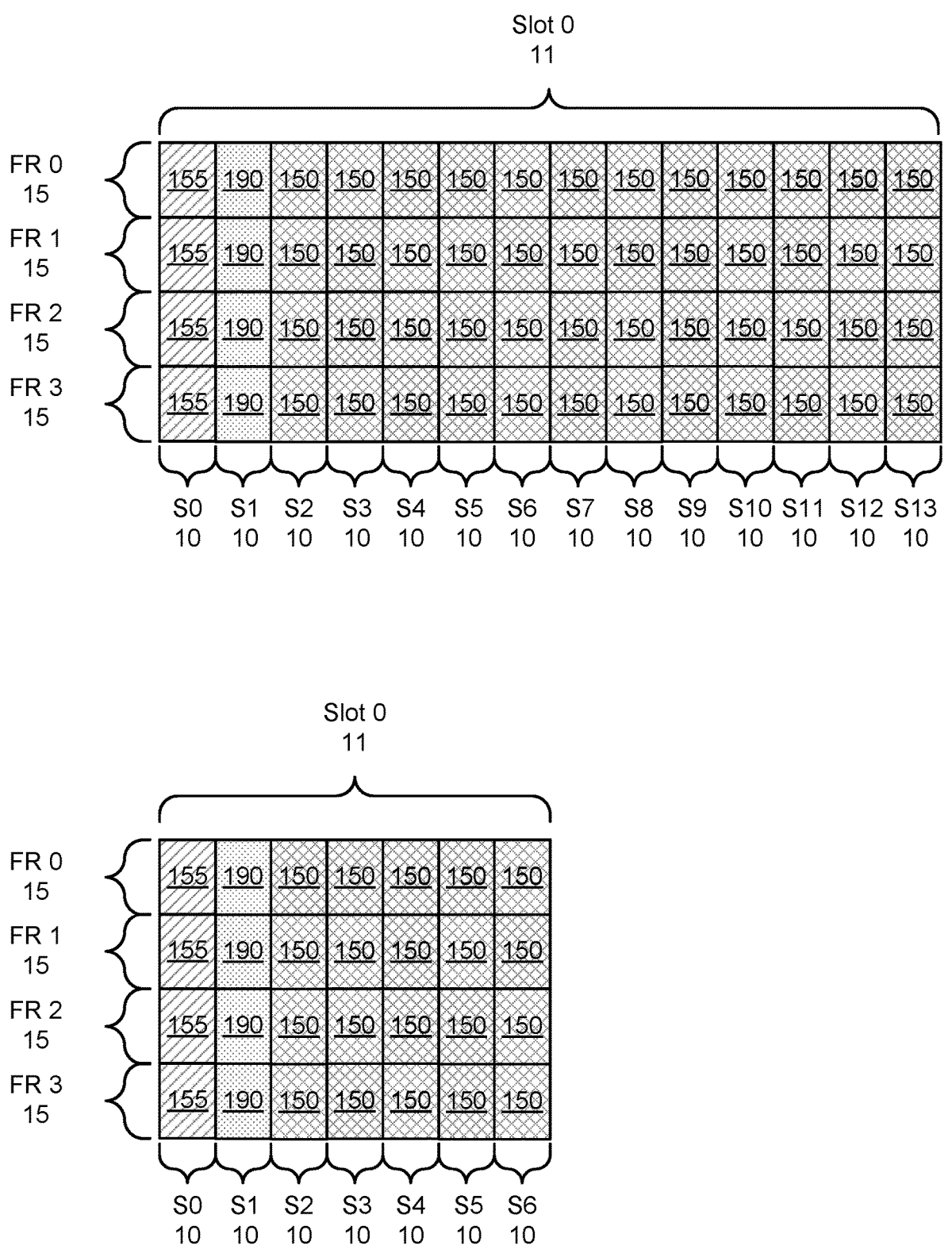

FIG. 2C is a schematic diagram illustrating one alternate embodiment of transmission controls 150/155 within slots 11. In the depicted embodiment, 14-symbol slots 11 and seven-symbol slots 11 are shown. The transmission control policy 290 may specify that the symbol position 203 of the given OFDM symbol 10 is OFDM symbols 0-1 10 for a slot transmission control 155 in the 14-symbol slot 11 and the seven-symbol slot 11. The symbol position 203 of the given OFDM symbol 10 may be one or more of OFDM symbols 1-6 10 for a seven-symbol mini-slot transmission control 150 in the seven-symbol slot 11. The symbol position 203 of the given OFDM symbol 10 is one or more of OFDM symbols 1-13 10 for a 14-symbol mini-slot transmission control 150 in the 14-symbol slot 11. The slot type indicator 205 may determine whether the transmission control 190 in OFDM symbol 1 10 is a slot transmission control 155 or a mini-slot transmission control 150.

Figure 2D:
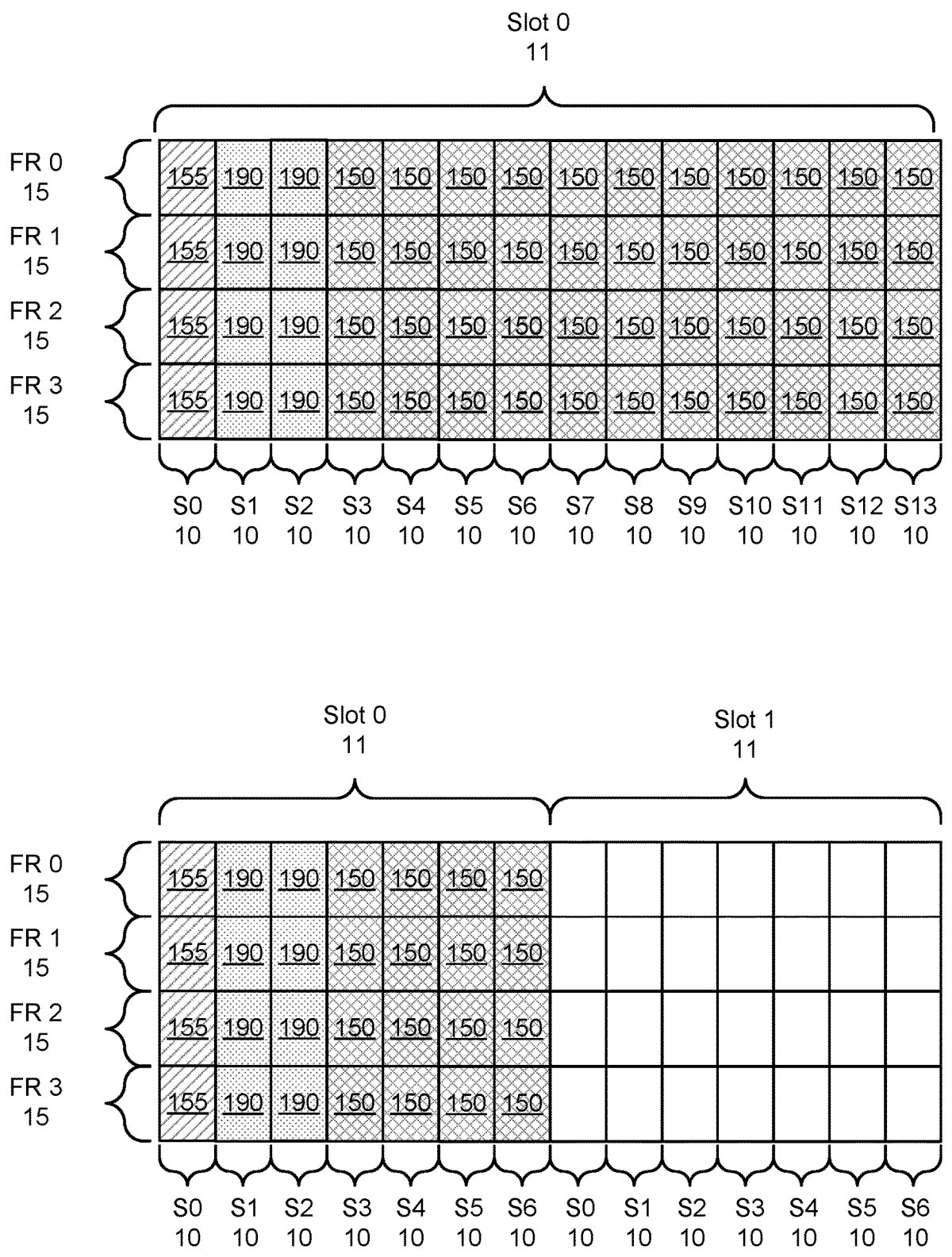

FIG. 2D is a schematic diagram illustrating one alternate embodiment of transmission controls 150/155 within slots 11. In the depicted embodiment, 14-symbol slots 11 and seven-symbol slots 11 are shown. The transmission control policy 290 may specify that the symbol position 203 of the given OFDM symbol 10 is OFDM symbols 0-2 10 for a slot transmission control 155 in the 14-symbol slot 11 and the seven-symbol slot 11. The symbol position 203 of the given OFDM symbol 10 may be one or more of OFDM symbols 1-13 10 for a 14-symbol mini-slot transmission control 150 in the 14-symbol slot 11. The symbol position 203 of the given OFDM symbol 10 may be one or more of OFDM symbols 1-6 10 for a seven-symbol mini-slot transmission control 150 in a seven-symbol slot 11. The slot type indicator 205 may determine whether the transmission control 190 in OFDM symbols 1 and 2 10 is a slot transmission control 155 or a mini-slot transmission control 150.

Figure 2E:
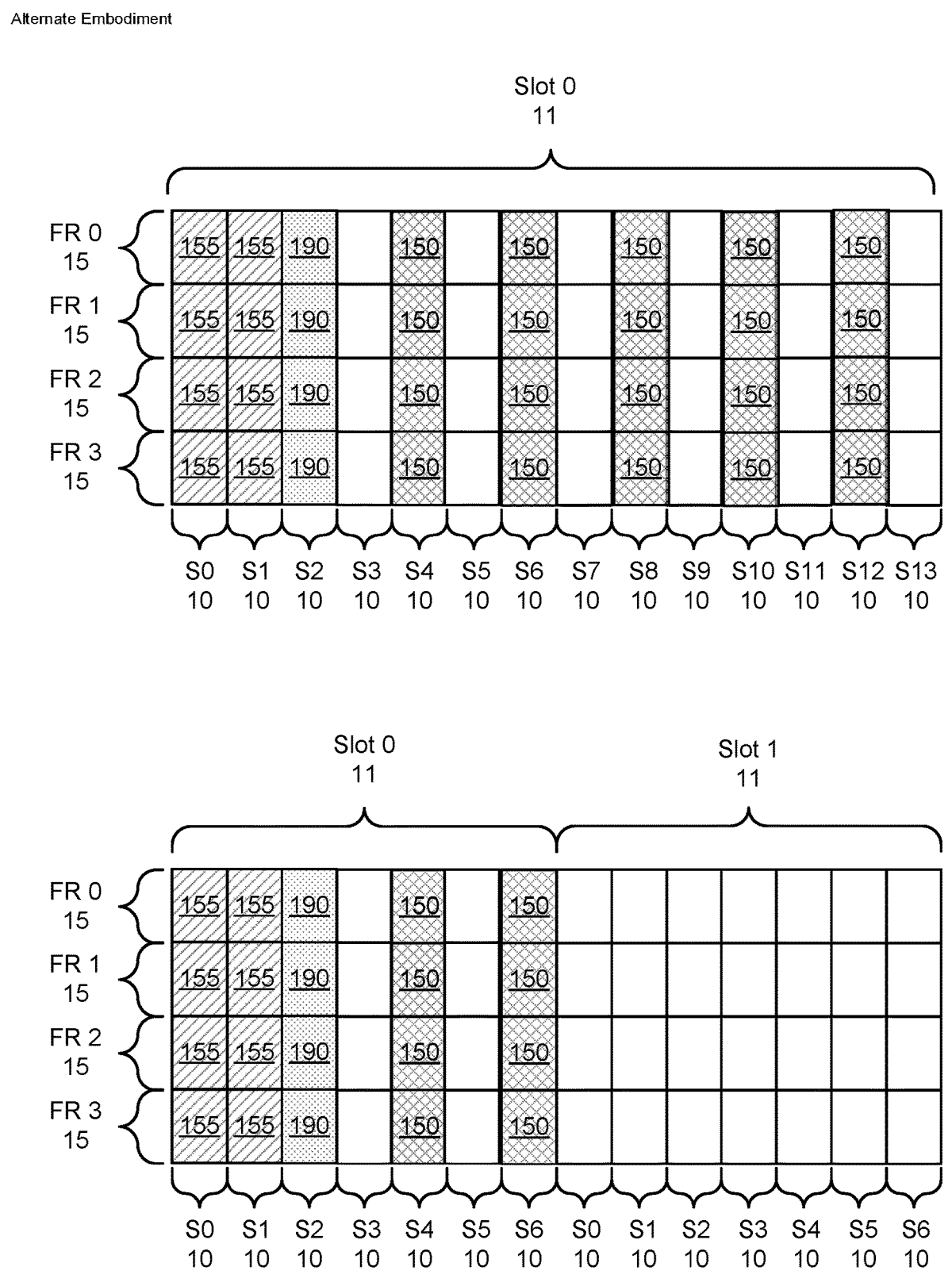

FIG. 2E is a schematic diagram illustrating one alternate embodiment of transmission controls 150/155 within slots 11. In the depicted embodiment, 14-symbol slots 11 and seven-symbol slots 11 are shown. The transmission control policy 290 may specify that the symbol position 203 of the given OFDM symbol 10 is OFDM symbols 0-2 10 for a slot transmission control 155 in the 14-symbol slot 11 and the seven-symbol slot 11. The symbol position 203 of the given OFDM symbol 10 may be selected from the group of consisting of OFDM symbol 2 10, OFDM symbol 4 10, OFDM symbol 6 10, OFDM symbol 8 10, OFDM symbol 10 10, and OFDM symbol 12 10 for a 14-symbol mini-slot transmission control 150 in the 14-symbol slot 11. The symbol position 203 of the given OFDM symbol 10 may be selected from the group of consisting of OFDM symbol 2 10, OFDM symbol 4 10, and OFDM symbol 6 10 for a seven-symbol mini-slot transmission control 150 in the seven-symbol slot 11. The slot type indicator 205 may determine whether the transmission control 190 in OFDM symbol 2 10 is a slot transmission control 155 or a mini-slot transmission control 150.

FIG. 2F is a schematic diagram illustrating one embodiment of transmission controls 150 within slots 11. In the depicted embodiment, 14-symbol slots 11 and seven-symbol slots 11 are shown. In one embodiment, the mini-slot transmission control 150 is received at a specified set of OFDM symbols 10 and frequency regions 15. In addition, the mini-slot transmission control 150 may be received no more than once each slot 11 in the given OFDM symbol 10.

FIG. 2G is a schematic diagram illustrating one alternate embodiment of transmission controls 150 within slots 11. In the depicted embodiment, the mini-slot transmission control 150 is received at a specified set of OFDM symbols 10 and frequency regions 15.

FIG. 2H is a schematic diagram illustrating one alternate embodiment of transmission controls 155 within slots 11. In the depicted embodiment, the slot transmission control 155 is received at a specified set of OFDM symbols 10 and frequency regions 15. In addition, the slot transmission control 155 may be received no more than once each slot 11 in the given OFDM symbol 10.

FIG. 2I is a schematic diagram illustrating one alternate embodiment of transmission controls 155 within slots 11. In the depicted embodiment, the slot transmission control 155 is received at a specified set of OFDM symbols 10 and frequency regions 15.

Figure 3A:
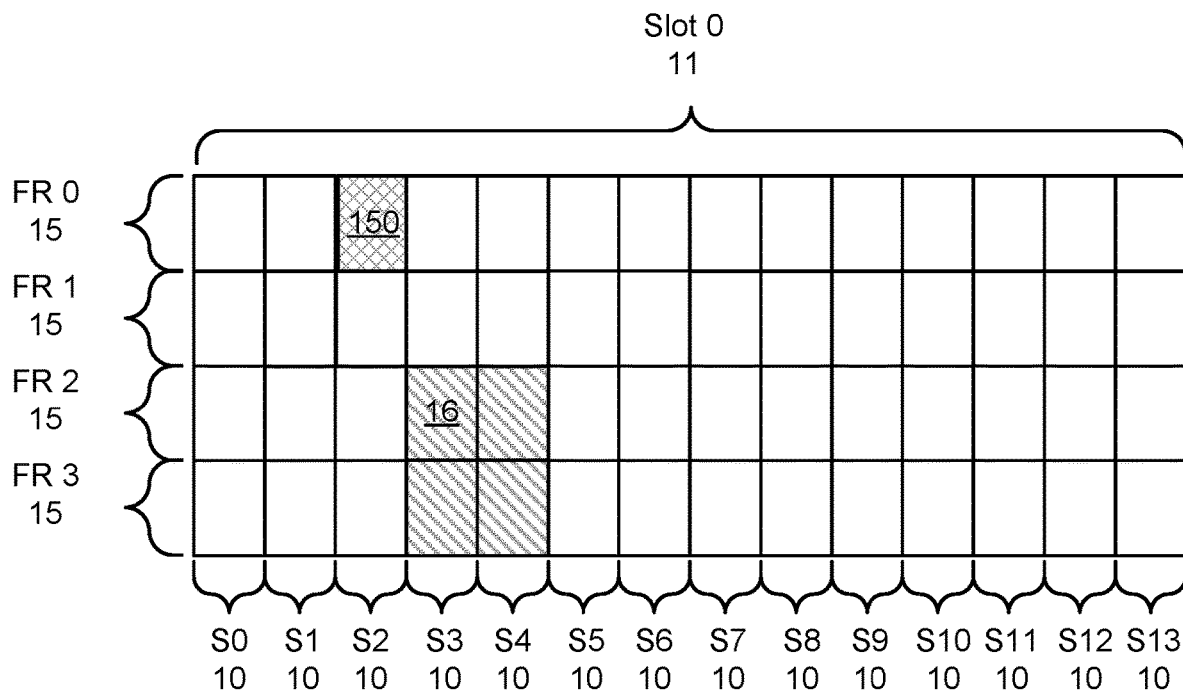
FIG. 3A is a schematic diagram illustrating one embodiment of data transmission within slots.

FIG. 3A is a schematic diagram illustrating one embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may include specified frequency ranges 15 for one or more OFDM symbols 10.

Figure 3B:
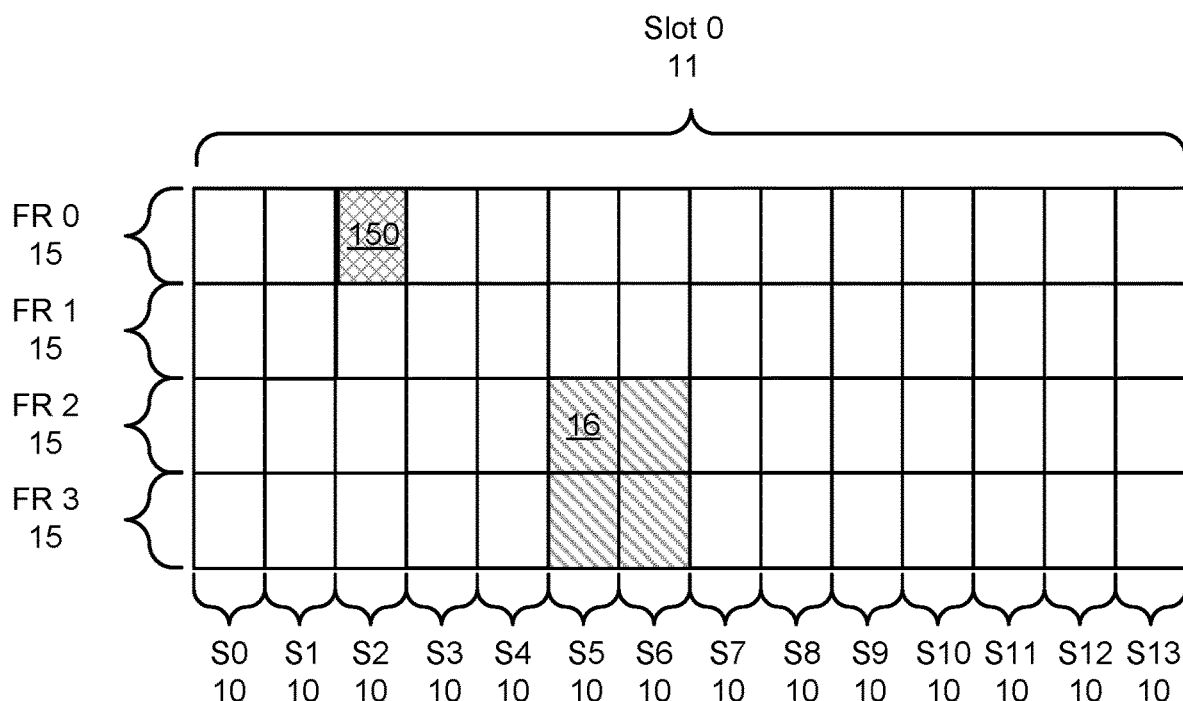
FIG. 3B is a schematic diagram illustrating one alternate embodiment of data transmission within slots.

FIG. 3B is a schematic diagram illustrating one alternate embodiment data transmission within slots 11. In the depicted embodiment, a first TFR 16 of the TFR 16 for a data transmission starts at an OFDM symbol 10 that follows the given OFDM symbol 10 with the mini-slot transmission control 150 after one or more OFDM symbols 10. The TFR 16 may include specified frequency ranges 15 for one or more OFDM symbols 10.

Figure 3C:
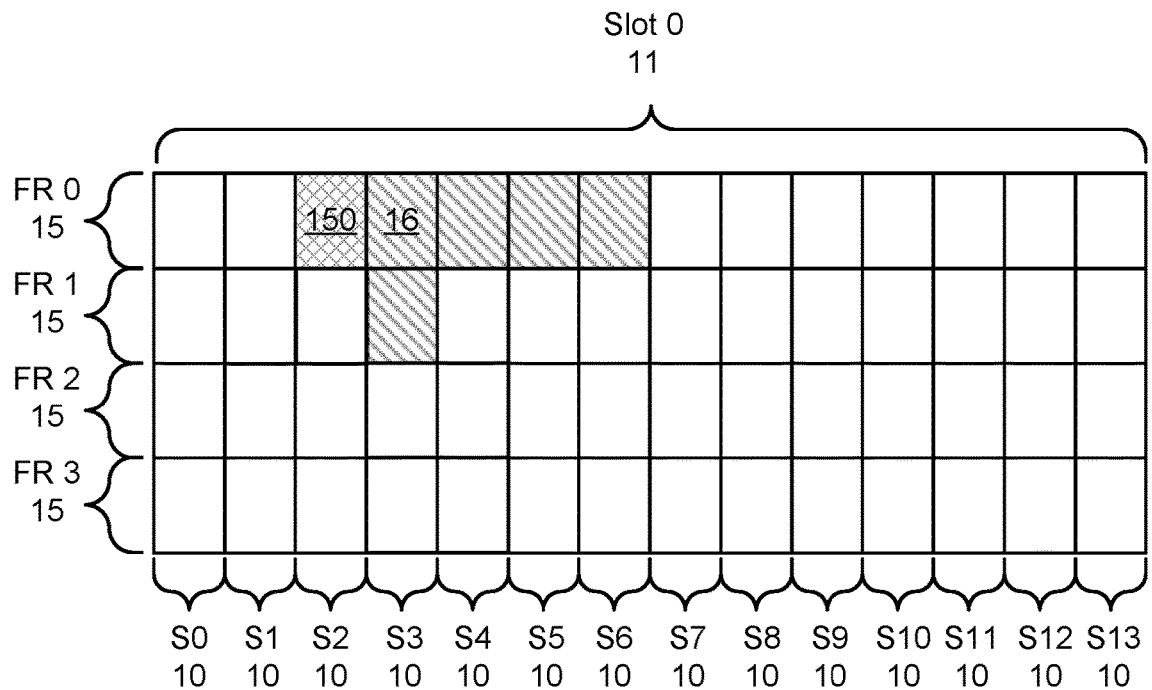
FIG. 3C is a schematic diagram illustrating one alternate embodiment of data transmission within slots.

FIG. 3C is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may include specified frequency ranges 15 for each OFDM symbols 10.

Figure 3D:
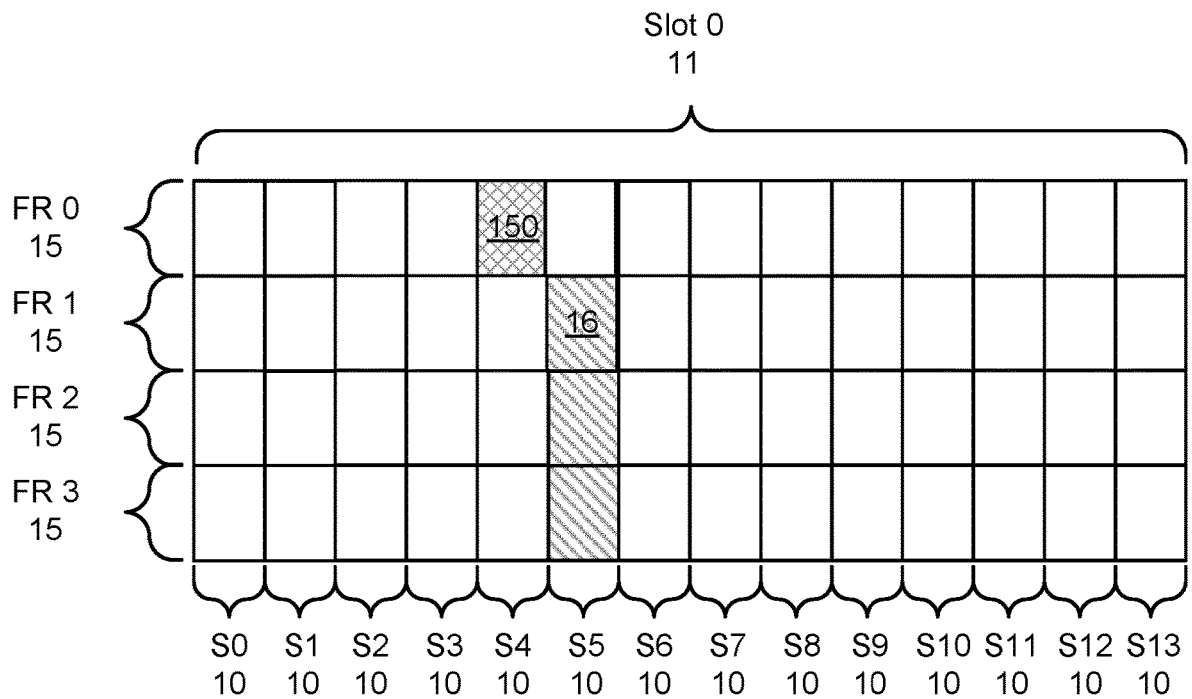
FIG. 3D is a schematic diagram illustrating one alternate embodiment of data transmission within slots.

FIG. 3D is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may include specified frequency ranges 15 for each OFDM symbols 10.

Figure 3E:
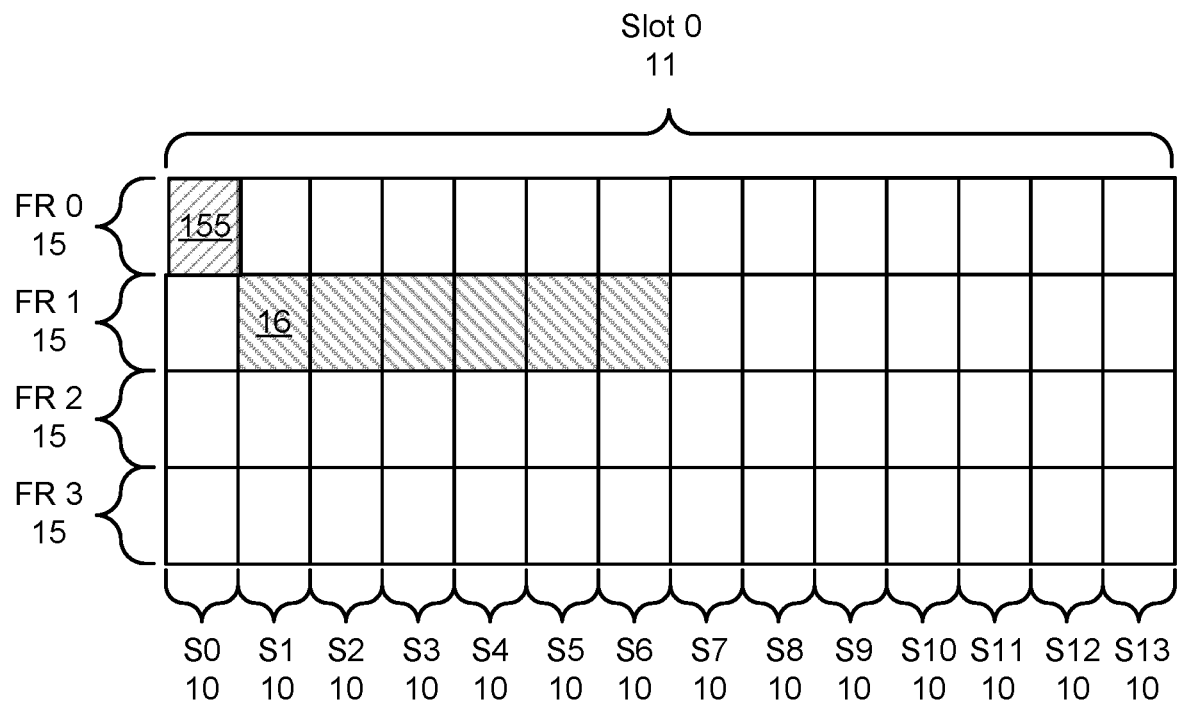
FIG. 3E is a schematic diagram illustrating one alternate embodiment of data transmission within slots.

FIG. 3E is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may include specified frequency ranges 15 for one or more OFDM symbols 10.

Figure 3F:
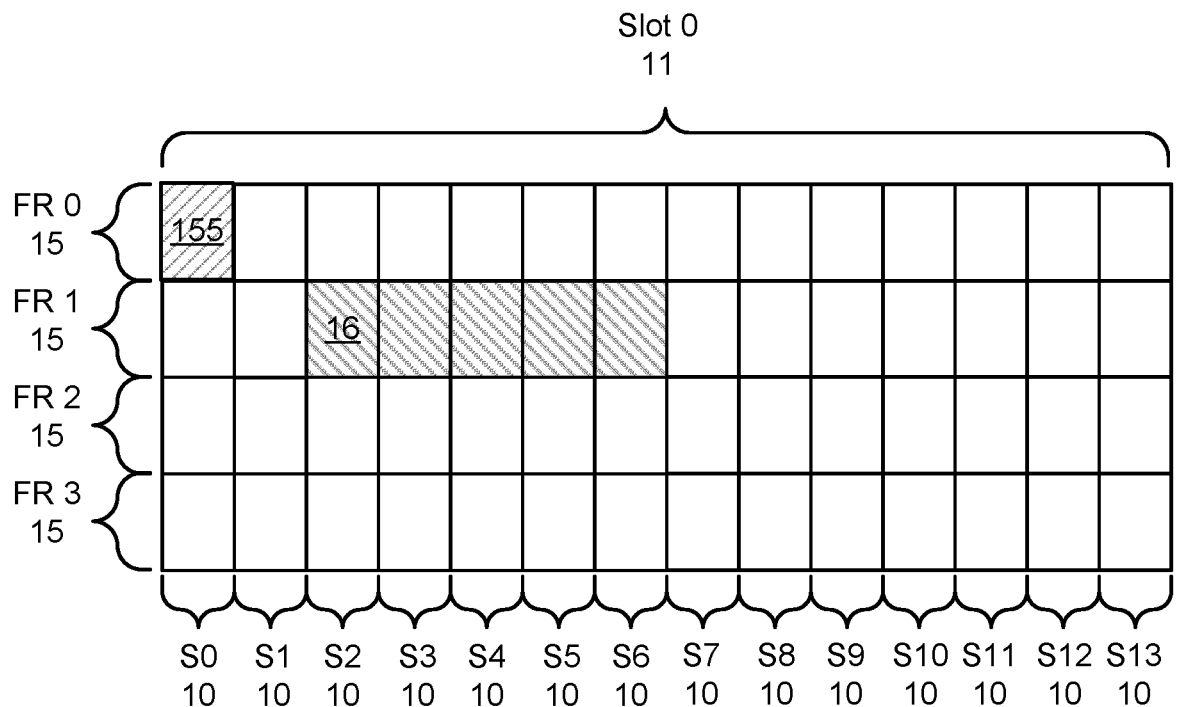
FIG. 3F is a schematic diagram illustrating one alternate embodiment of data transmission within slots.

FIG. 3F is a schematic diagram illustrating one alternate embodiment of data transmission within slots 11. In the depicted embodiment, a first TFR 16 of the TFR 16 for a data transmission starts at an OFDM symbol 10 that follows the given OFDM symbol 10 with the mini-slot transmission control 150 after one or more OFDM symbols 10. The TFR 16 may include specified frequency ranges 15 for one or more OFDM symbols 10.

Figure 3G:
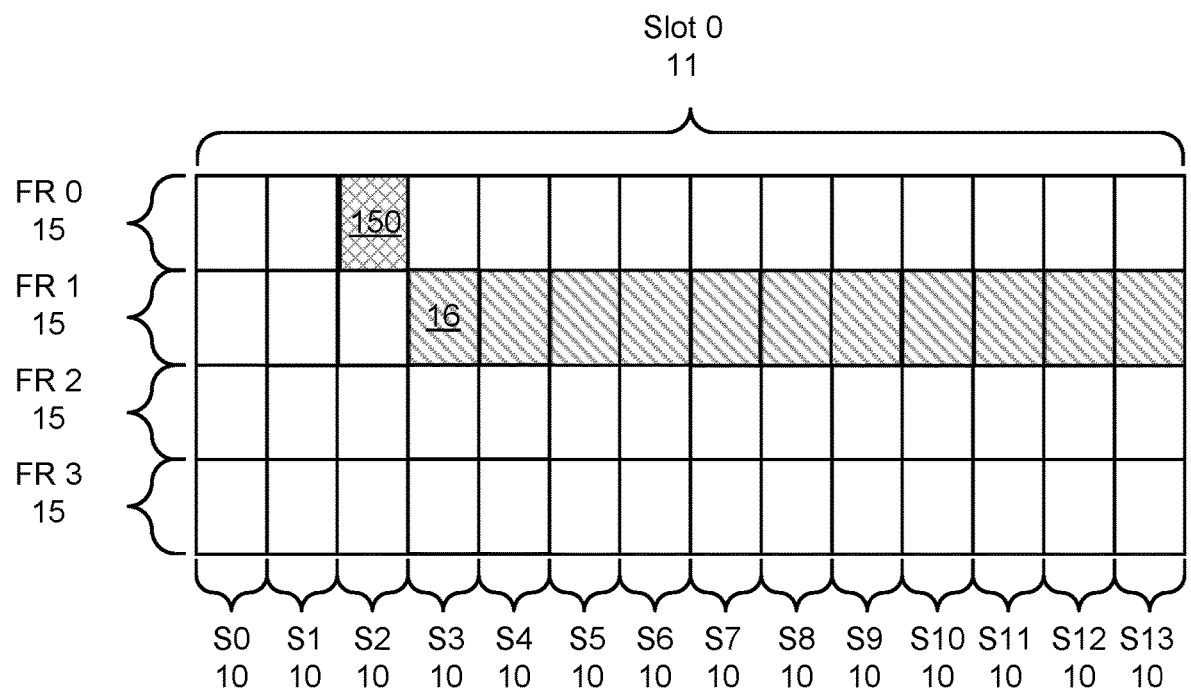
FIG. 3G is a schematic diagram illustrating one alternate embodiment of data transmission within slots.

FIG. 3G is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may end at OFDM symbol 13 10 of the 14-symbol slot 11. The TFR 16 may include specified frequency ranges 15 for one or more OFDM symbols 10. The TFR 16 may be a mini-TFR 16 that starts at an OFDM symbol 10 immediately following the given OFDM symbol 10 and comprises 2 to 12 OFDM symbols 10. The mini-TFR 16 may be embodied in a mini-slot 17.

Figure 3H:
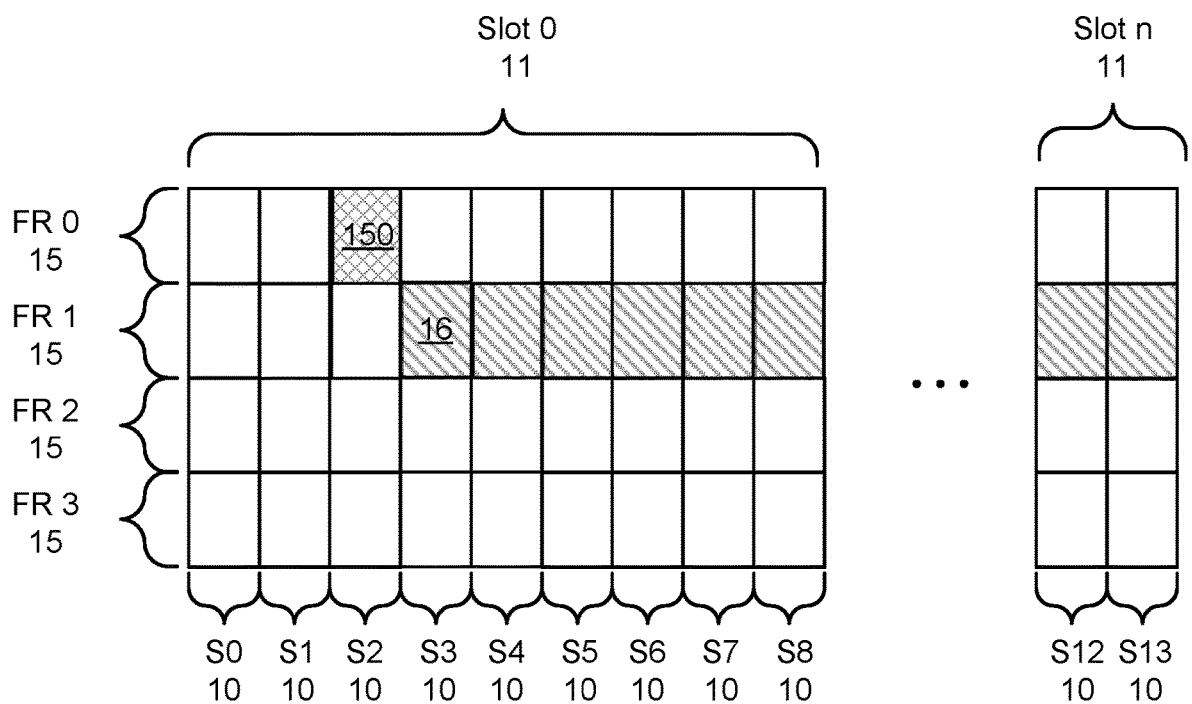
FIG. 3H is a schematic diagram illustrating one alternate embodiment of data transmission within slots.

FIG. 3H is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the mini-slot transmission control 150. The TFR 16 may further and at OFDM symbol 13 10 of a subsequent slot 11. The TFR 16 may include specified frequency ranges 15 for one or more OFDM symbols 10 of one or more slots 0-*n* 11.

Figure 3I:
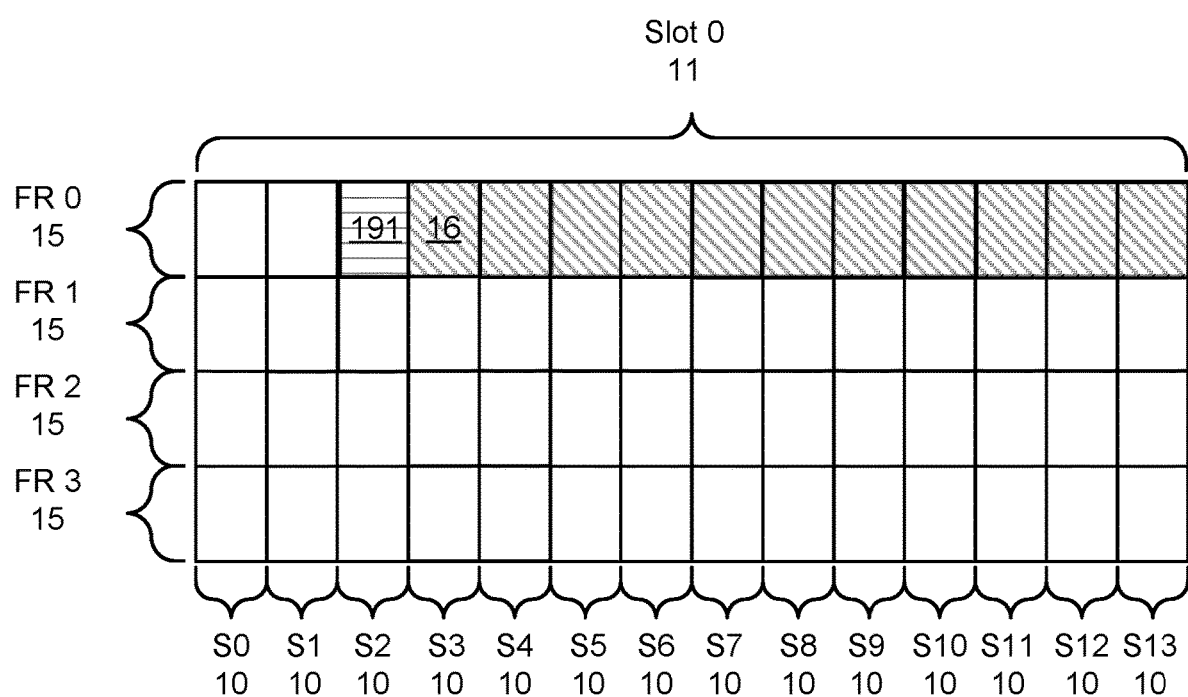
FIG. 3I is a schematic diagram illustrating one embodiment of data transmission.

FIG. 3I is a schematic diagram illustrating one embodiment of data transmission 191. In the depicted embodiment, a transmission 191 comprising a mini-slot transmission control 150 and the TFR 16 is at the given OFDM symbol 10 on different subcarriers at a specified frequency range 15. The TFR 16 may further include subsequent OFDM symbols 10.

Figure 4A:
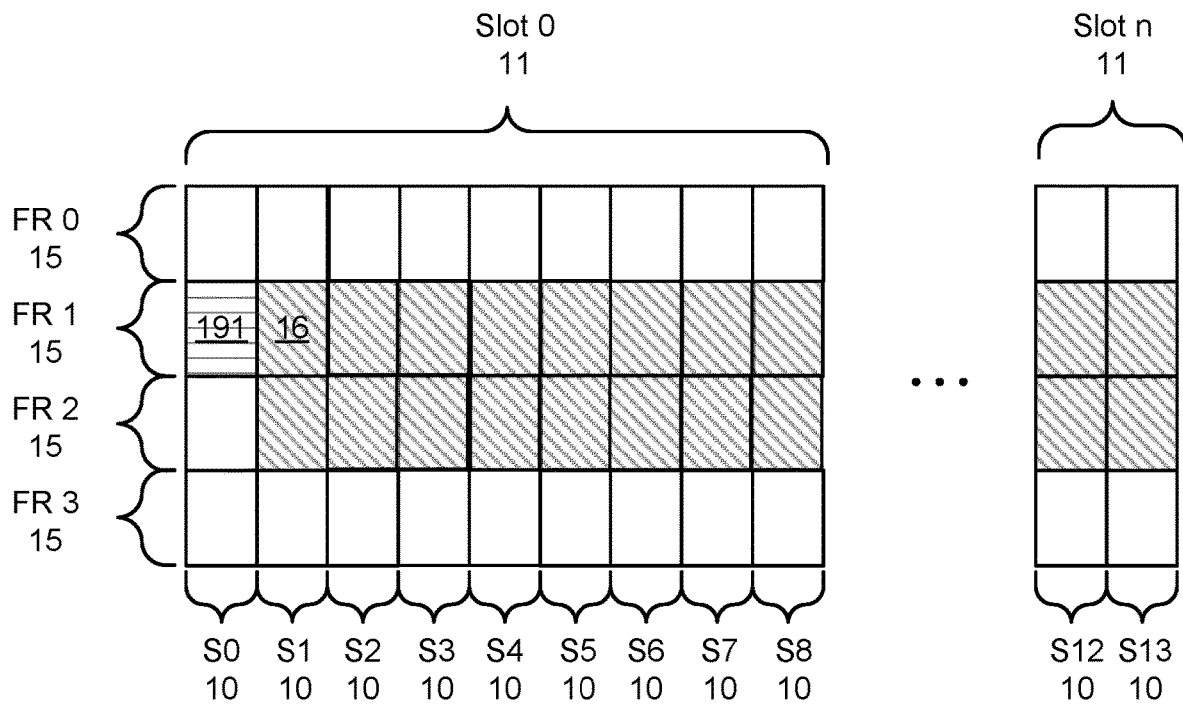
FIG. 4A is a schematic diagram illustrating one alternate embodiment of data transmission within slots.

FIG. 4A is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the transmission 191. The TFR 16 may include specified frequency ranges 15 for one or more OFDM symbols 10. The TFR 16 may end at OFDM symbol 13 10 of a last 14-symbol slot 11. The TFR 16 may include specified frequency ranges 15 for one or more OFDM symbols 10 of one or more 14-symbol slots 0-*n* 11.

Figure 4B:
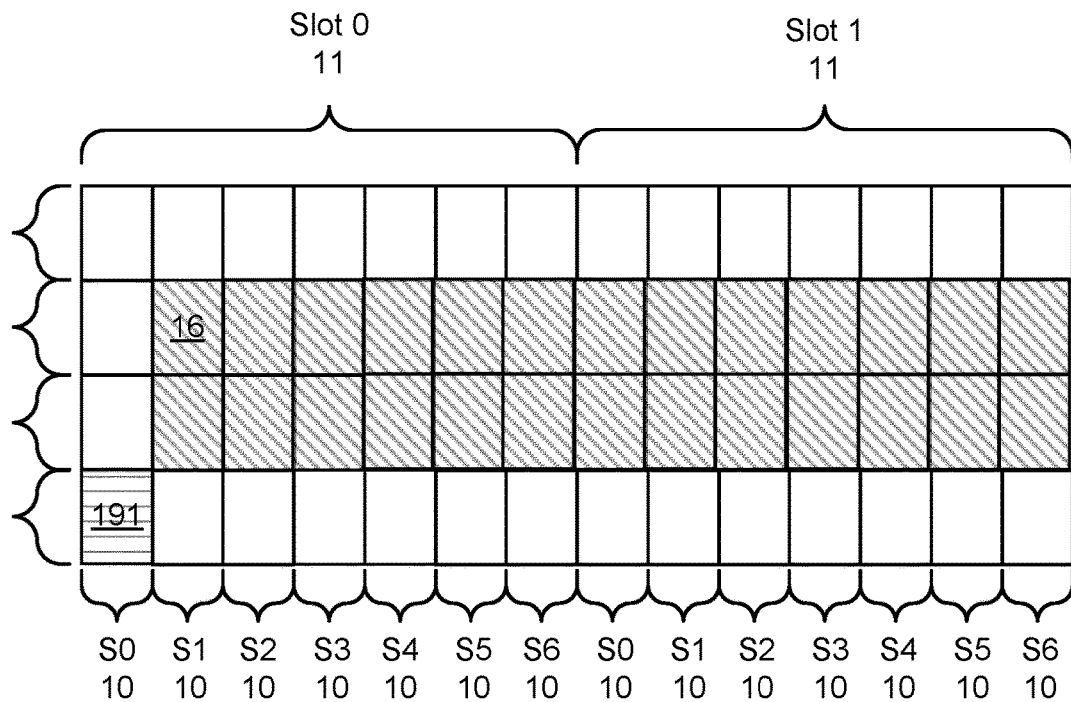
FIG. 4B is a schematic diagram illustrating one alternate embodiment of data transmission within slots.

FIG. 4B is a schematic diagram illustrating one alternate embodiment of data transmission within slots 11. In the depicted embodiment, a first TFR 16 of the TFR 16 for a data transmission starts at an OFDM symbol 10 immediately following the given OFDM symbol 10 with the transmission 191. The TFR 16 may end at a OFDM symbol 6 10 of a last seven-symbol slot 11. The TFR 16 may include specified frequency ranges 15 for one or more OFDM symbols 10. The TFR 16 may include specified frequency ranges 15 for one or more OFDM symbols 10 of one or more seven-symbol slots 11.

Figure 4C:
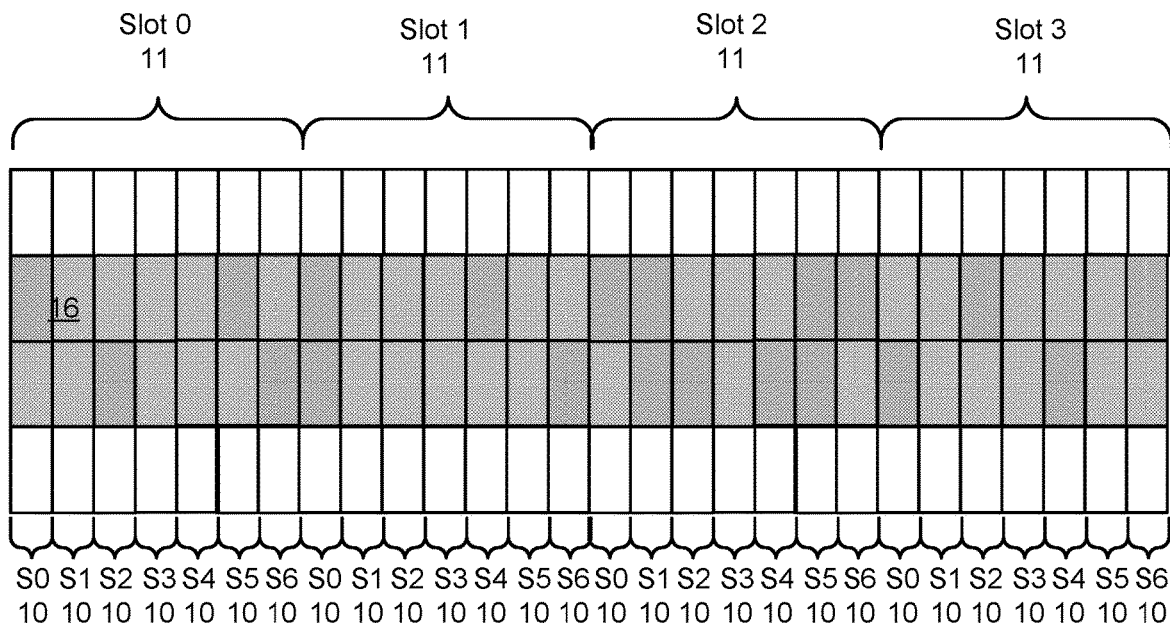
FIG. 4C is a schematic diagram illustrating one alternate embodiment of data transmission within slots.

FIG. 4C is a schematic diagram illustrating one alternate embodiment of data transmission within slots 11. In the depicted embodiment, the TFR number 201 is four. For a given TFR number 201 that is greater than one, the TFR 16 ends at a last OFDM symbol 10 of a slot 11 subsequent to the first slot 11. The TFR 16 comprise the TFR number 201 of TFR 16 transmitted in the number of TFR slots 11.

Figure 4D:
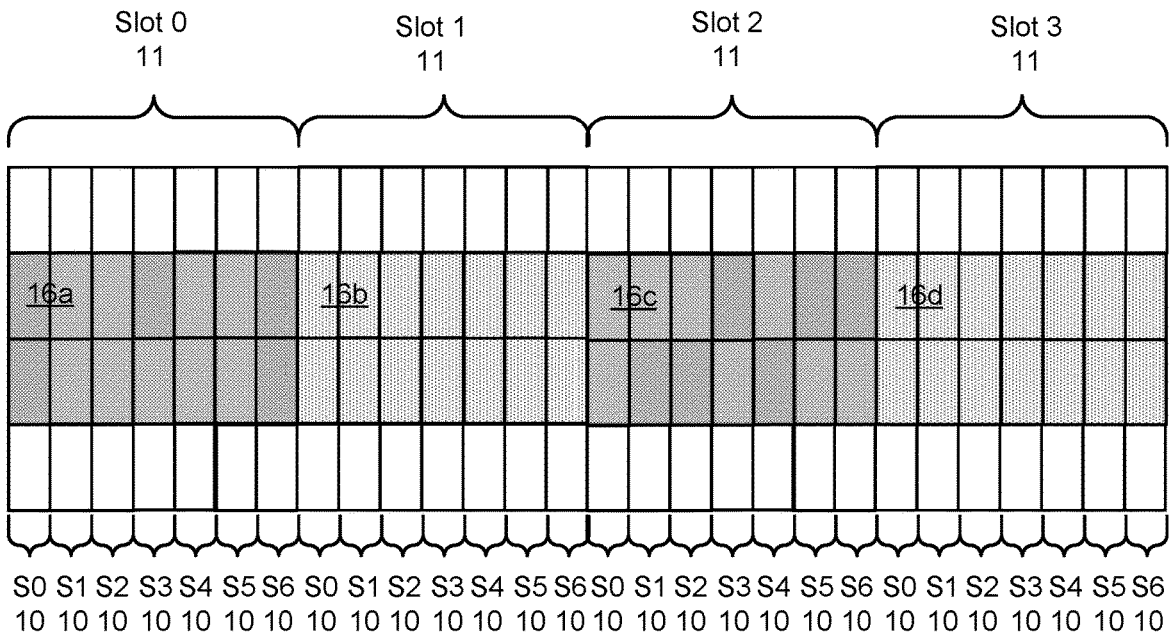
FIG. 4D is a schematic diagram illustrating one alternate embodiment of data transmission within slots.

FIG. 4D is a schematic diagram illustrating one alternate embodiment of data transmission within slots 11. In the depicted embodiment, four TFR 16*a-d* are transmitted in four slots 11. In one embodiment, the TFR number 201 specifies the number of TFR 16.

FIG. 5A is a schematic diagram illustrating one embodiment of a reserved resource marker 195. In the depicted embodiment, a transmission control with reserved resource marker 195 is received. The reserved resource marker 195 may specify a reserved OFDM symbol 170. The reserved OFDM symbols 170 may allow other devices such as mobile device 110 to transmit acknowledgements such as a Hybrid Automatic Repeat Request Acknowledge (HARQ-ACK). Data transmission may be omitted in the reserved OFDM symbols 170 by mobile devices 110 receiving the reserved resource marker 195. In the depicted embodiment, the reserved OFDM symbol 170 is a last OFDM symbol 10 of a slot 11.

Figure 5B:
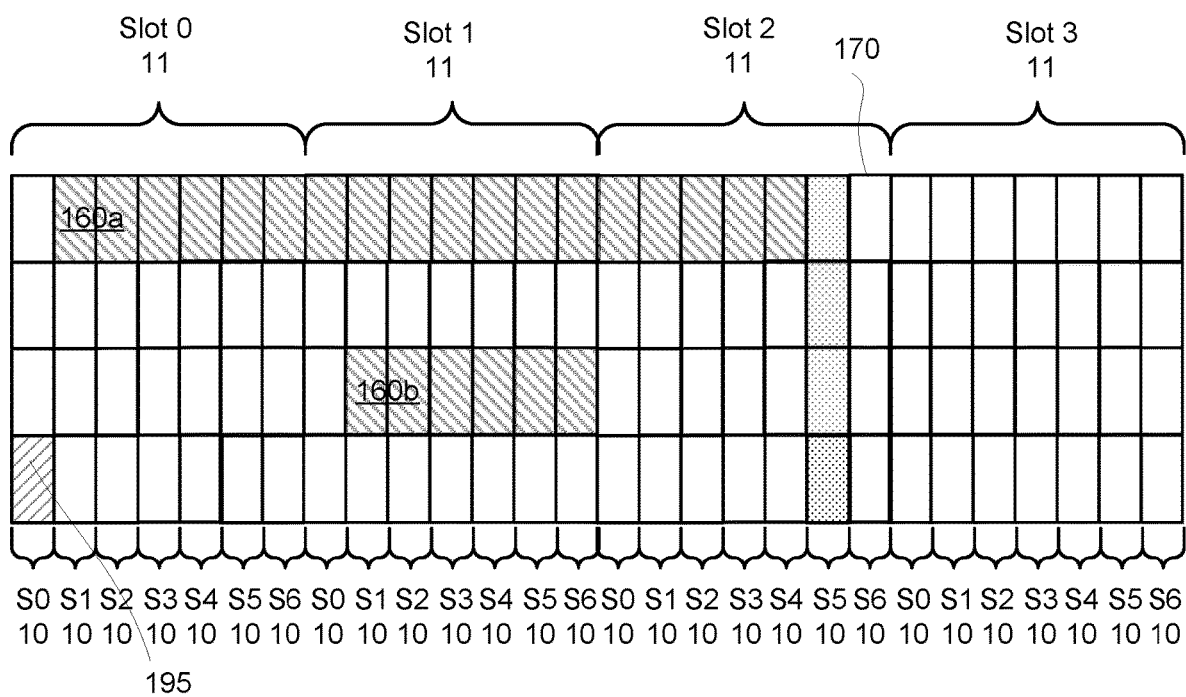
FIG. 5B is a schematic diagram illustrating one alternate embodiment of a resource marker.

FIG. 5B is a schematic diagram illustrating one alternate embodiment of a reserved resource marker 195. In the depicted embodiment, a transmission control with reserved resource marker 195 is received. The reserved resource bitmap 213 may specify which OFDM symbols 10 and slots 11 include reserved OFDM symbols 170. Each reserved OFDM symbol 170 may be reserved for one or more of an uplink communication from mobile devices 110 to the base station 120, a side link communication between mobile devices 120, and a backhaul communication.

Figure 6A:
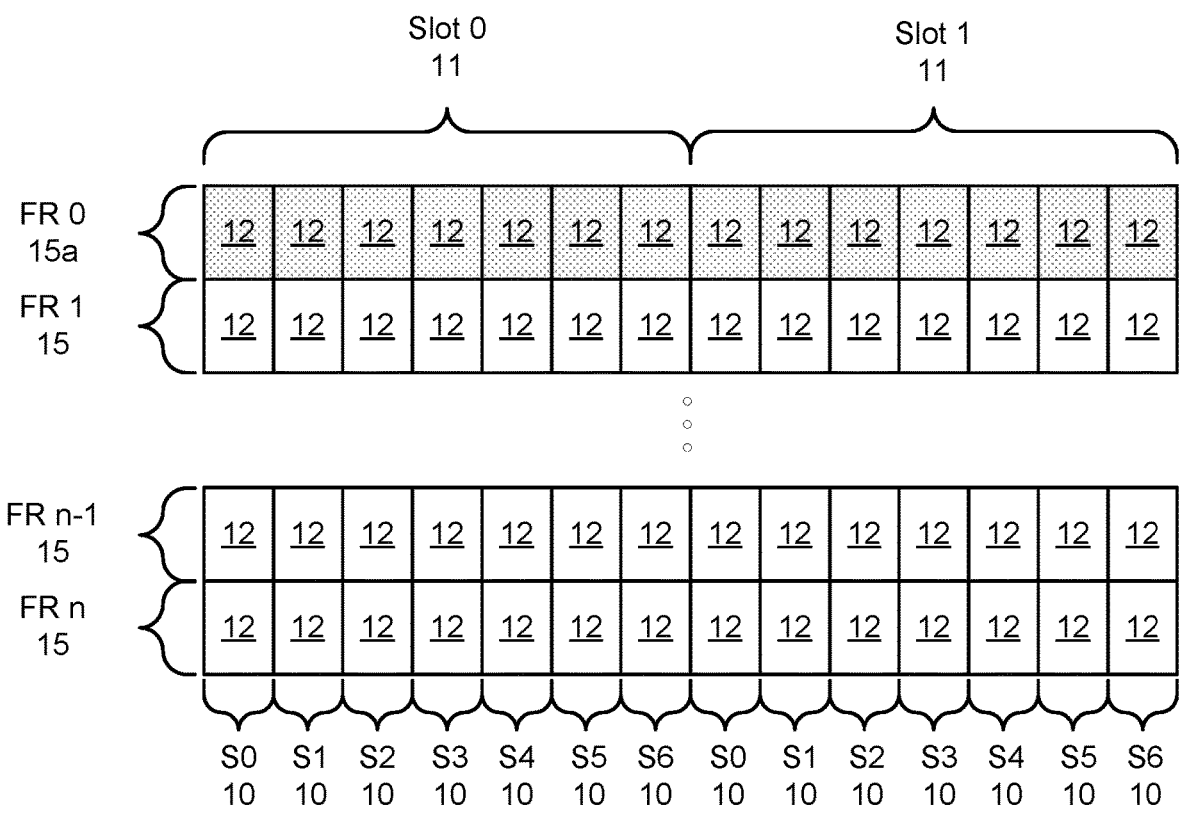
FIG. 6A is a schematic diagram illustrating one embodiment of multiple numerologies.

FIG. 6A is a schematic diagram illustrating one embodiment of multiple numerologies. In the depicted embodiment, the numerology scheme 280 specifies a first frequency region definition 281 and the first subcarrier spacing 283 for a first frequency region 0 15. The numerology scheme 280 may further specify a second frequency region definition 281 and the second subcarrier spacing 283 for one or more second frequency regions 1-*n* 15.

Figure 6B:
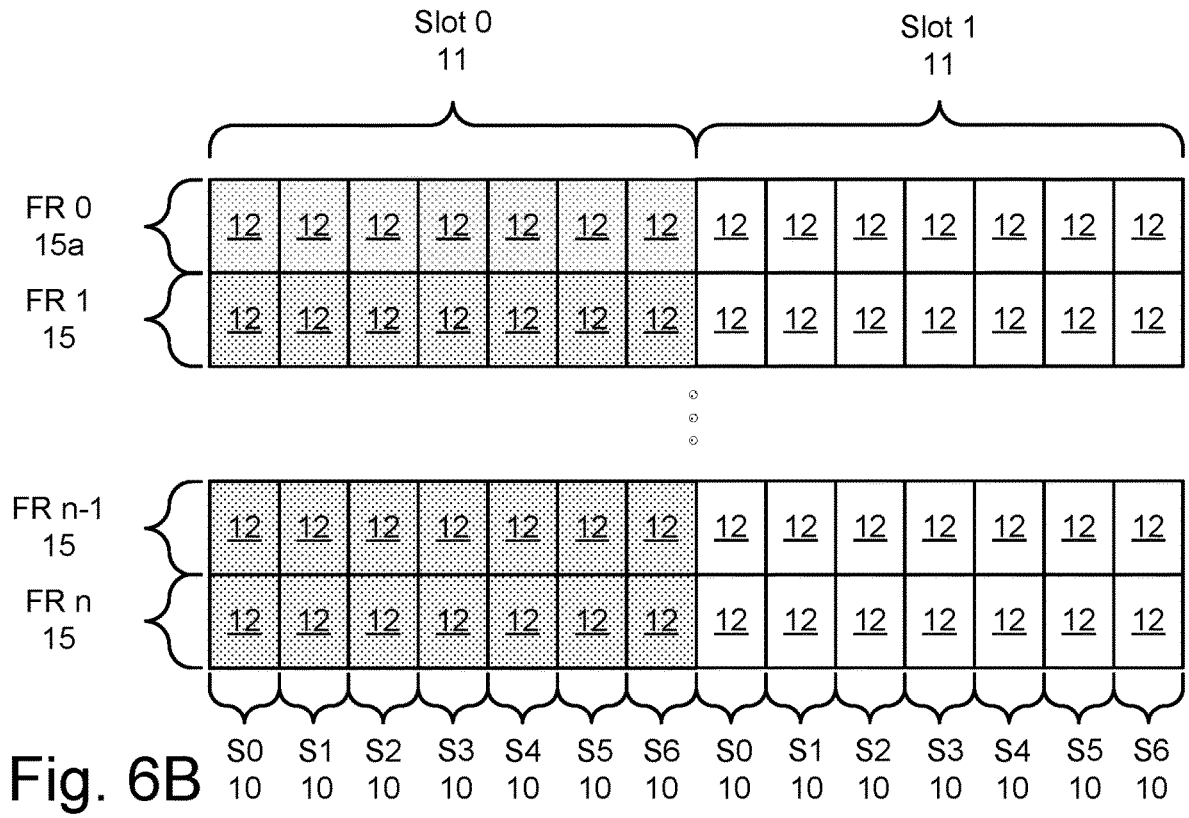
FIG. 6B is a schematic diagram illustrating one alternate embodiment of multiple numerologies.

FIG. 6B is a schematic diagram illustrating one alternate embodiment of multiple numerologies. In the depicted embodiment, a first set of slots 11 comprising slot 0 11 is configured with the first numerology scheme 280 and a second set of slots 11 comprising slot 1 11 is configured with a second numerology scheme 280. In one embodiment, the first set of slots 11 is configured with a first sub-carrier spacing 283 and the second set of slots 11 is configured with a second sub-carrier spacing 283.

Figure 6C:
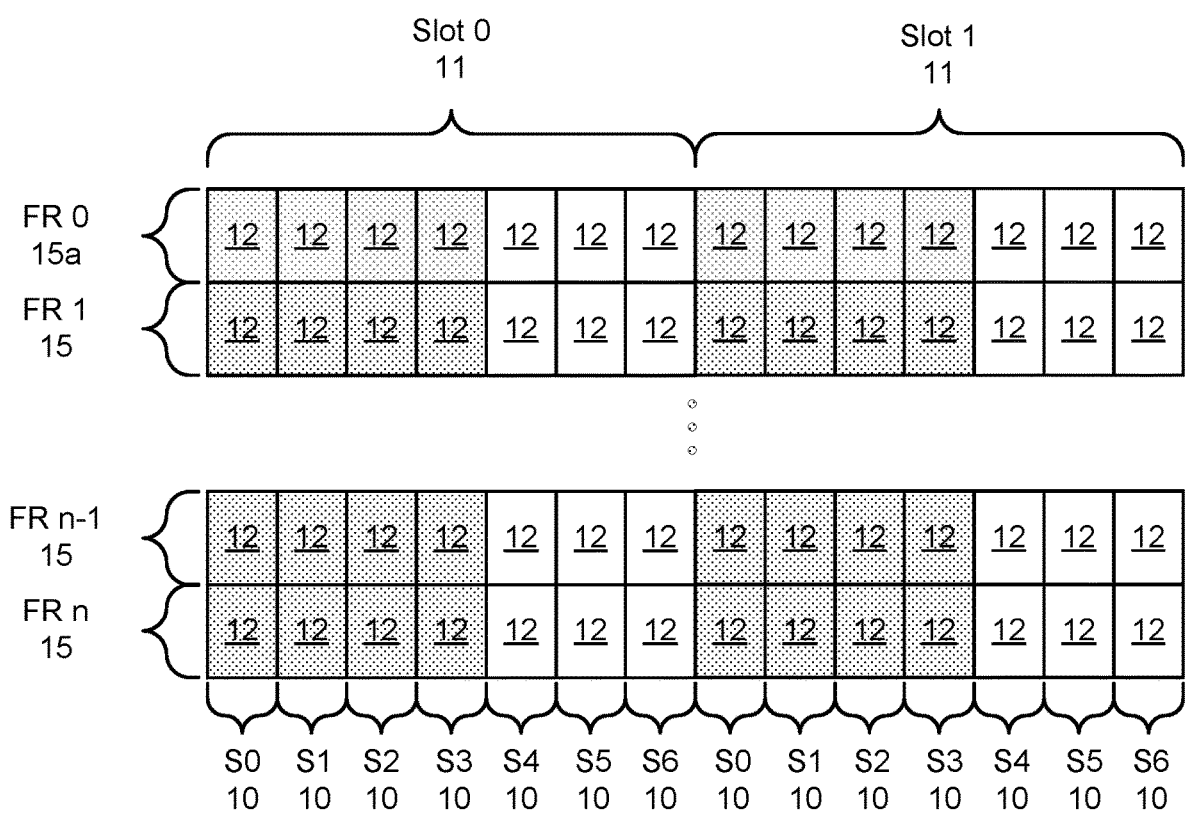
FIG. 6C is a schematic diagram illustrating one alternate embodiment of multiple numerologies.

FIG. 6C is a schematic diagram illustrating one alternate embodiment of multiple numerologies. In the depicted embodiment, a first set of OFDM symbols 0-3 10 is configured with a first numerology scheme 280 and a second set of OFDM symbols 4-6 10 is configured with a second numerology scheme 280. In one embodiment, the first set of OFDM symbols 10 is configured with a first sub-carrier spacing 283 and the second set of OFDM symbols 10 is configured with a second sub-carrier spacing 283.

Figure 7:
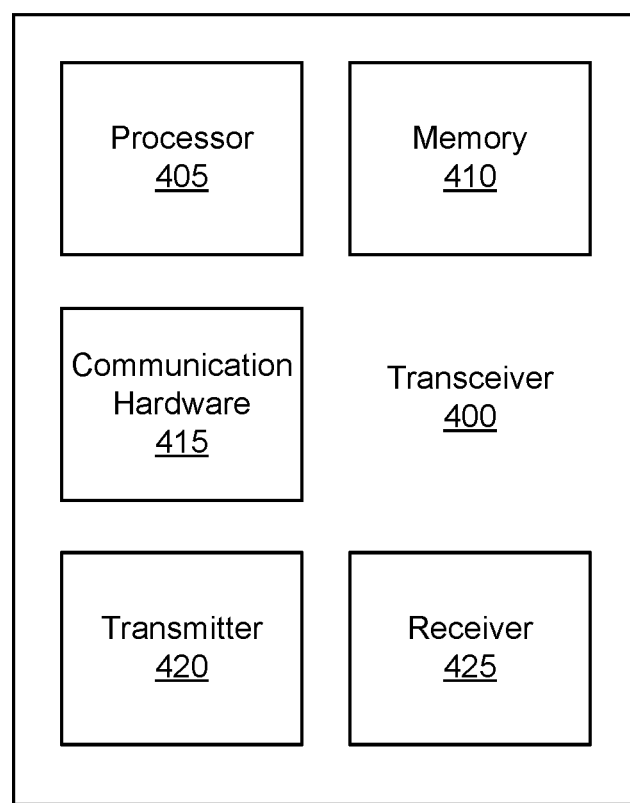
FIG. 7 is a schematic block diagram illustrating one embodiment of a transceiver.

FIG. 7 is a schematic block diagram illustrating one embodiment of a transceiver 400. The transceiver 400 may be embodied in the mobile device 110 and/or the base station 120. In the depicted embodiment, the transceiver 400 includes a processor 405, memory 410, communication hardware 415, a transmitter 420, and receiver 425. The memory 410 may include a semiconductor storage device, hard disk drive, an optical storage device, or combinations thereof. The memory 410 may store code. The processor 405 may execute the code. The communication hardware 415 may coordinate communications between the processor 405 and the transmitter 420 and the receiver 425.

Figure 8A:
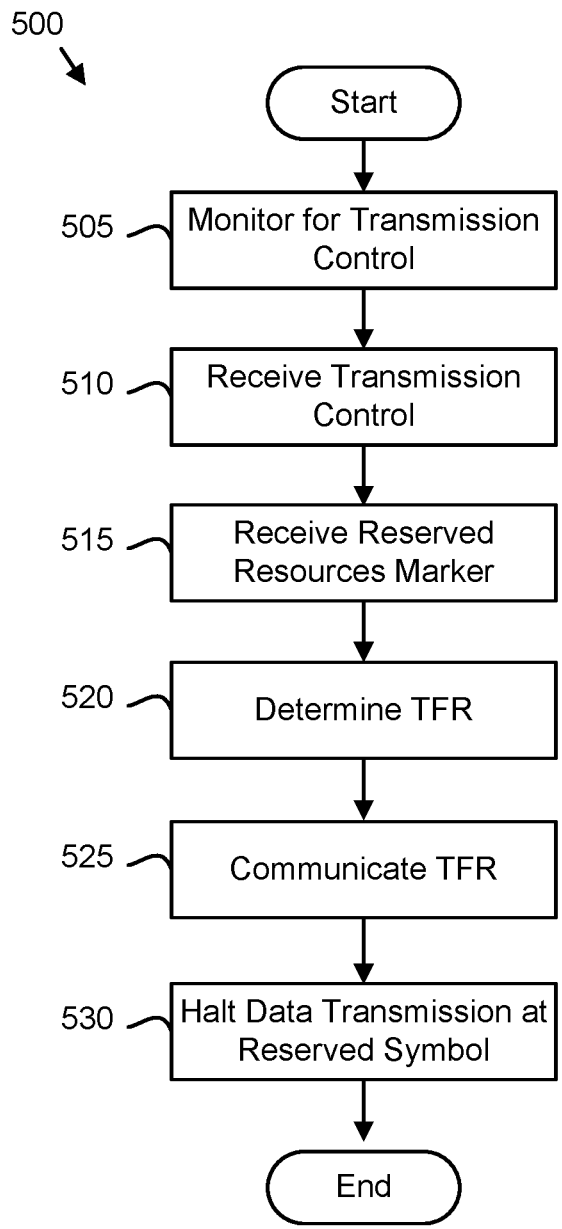
FIG. 8A is a schematic flowchart diagram illustrating one embodiment of the scheduling method.

FIG. 8A is a schematic flowchart diagram illustrating one embodiment of the scheduling method 500. The method 500 may determine available TFR 16 for a data transmission. The method 500 may be performed by the transceiver 400 and/or the processor 405 of the transceiver 400.

The method 500 starts, and in one embodiment, the processor 405 monitors 505 for a transmission control 150/155 in a given OFDM symbol 10 of a first slot 11 based on the symbol position 203 of the transmission control policy 290. The transmission control policy 290 may specify one or more OFDM symbols 10 specified by the symbol position 203 and/or one or more frequency ranges 15 specified by the control frequency ranges 204 to monitor 505. FIGS. 2A-I illustrates examples of given OFDM symbols 10 that may be monitored 505.

In one embodiment, slots 11 are monitored for the transmission control 150/155 based on the OFDM symbol duration for a frequency region 15. For example, slots 11 with shorter OFDM symbol durations may be monitored for the transmission control 150/155 in a limited set of given OFDM symbols 10 while slots 11 with longer OFDM symbol durations may be monitored for the transmission control 150/155 in an expanded set of given OFDM symbols 10.

The processor 405 may receive 510 the transmission control 150/155 in the given OFDM symbol 10. The transmission control 150/155 may be a mini-slot transmission control 150 or a slot transmission control 155.

In one embodiment, the processor 405 receives 515 the reserved resources marker 195 with the transmission control 150/155. The reserved resources marker 195 may specify a reserved OFDM symbol 170.

The processor 405 determines 520 the available TFR 16 for the data transmission based on at least a symbol position 203 of the given OFDM symbol 10 and the transmission control policy 290. In one embodiment, the processor 405 omits TFR 16 in the reserved OFDM symbol 170. The TFR 16 comprise at least one OFDM symbol 10 and at least one frequency range 15. The processor 405 further communicates 525 the transmission data in the TFR 16 and the method 500 ends.

Figure 8B:
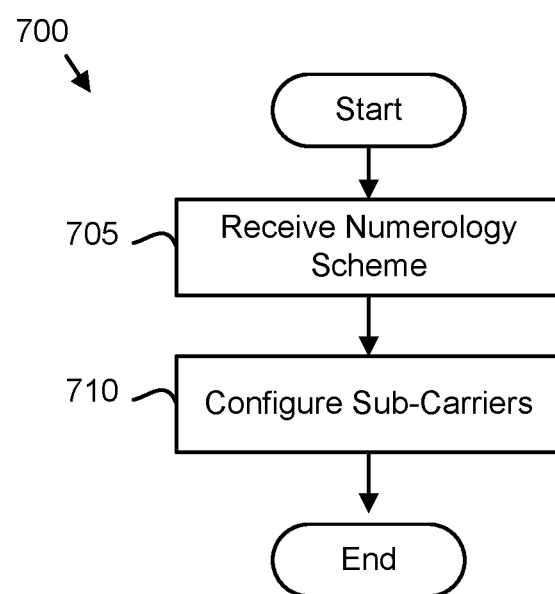
FIG. 8B is a schematic flow chart diagram illustrating one embodiment of a multiple numerology method.

FIG. 8B is a schematic flow chart diagram illustrating one embodiment of a multiple numerology method 700. The method 700 configures subcarriers 14 for at least one frequency region 15 based on the numerology scheme 280. The method 700 may be performed by the transceiver 400 and/or the processor 405 of the transceiver 400.

The method 700 starts, and in one embodiment, the processor 405 receives 705 the numerology scheme 280. In one embodiment, the numerology scheme 280 is received 705 when the mobile device 110 connects with the base station 120.

The processor 405 further configures 710 the subcarriers 14 for at least one frequency region 15 based on the numerology scheme 280 and the method 700 ends. In addition, the processor 405 may configure the subcarrier spacing 283 and frequency region definition 281 for the subcarriers 14.

In one embodiment, a 'subframe duration' is 1 ms for a reference numerology with 15 kHz subcarrier spacing, and $\frac{1}{2}^m$ ms for reference numerology with $2^m*15$ kHz subcarrier spacing.

While the 'subframe duration' is defined using a reference numerology, 'slot 11' and 'mini-slot 17' are defined in terms of the numerology used for transmission. The numerology used of transmission of slot/mini-slot can be different from the reference numerology used for determining subframe duration. 'Slot 11' and 'mini-slot 17' durations can be characterized as below FIG. 9 illustrates slot durations 91 and mini-slot durations 94 considering two example subcarrier-spacing values 15 kHz and 60 kHz. As shown in the figure, defining a 1 symbol mini-slot allows continuous opportunities to send a transmission control 150/155 such as a Downlink (DL) control to the mobile derive 110, referred to hereafter as UE. UE can be configured with a Mini-slot comprising number of OFDM symbols in the numerology used for transmission smaller than the number of OFDM symbols in a slot. It is desirable to minimize the number of supported mini-slot lengths, i.e., support only 1 symbol mini-slot. However, if multiple mini-slot lengths are defined (e.g. 1 symbol and 2 symbol mini-slots are defined), the UE can be configured with only one mini-slot length at any given time. DL control signaling can be sent to the UE once every slot duration. If the UE is configured with a Mini-slot, DL control signaling can be sent to the UE once every mini-slot, in addition to once every slot. The opportunities include opportunities to send a slot transmission control 92 and opportunities to send a mini-slot transmission control 93. This is suitable for supporting latency critical traffic applications, and also for operating in spectrum where carrier sense multiple access is needed or desirable (e.g. unlicensed spectrum). Configuring a mini-slot 17 does not necessarily increase overhead (overhead would mainly depend on the resource granularity used for scheduling data transmissions). However, it can impact UE complexity and power consumption. Appropriate control channel reception and DRX mechanisms to should be designed to address this issue. UE control channel decoding complexity can be reduced by having similar control channel transmission structure for slot based and mini-slot based DL control.

Resource Allocation Units

Another aspect to consider is resource allocation granularity, i.e., the granularity with which DL/Uplink (UL) resources can be assigned/granted to the UE. Considering the wide range of use cases targeted for NR, flexible resource allocation granularity in both time and frequency domain is desirable.

Figure 10:
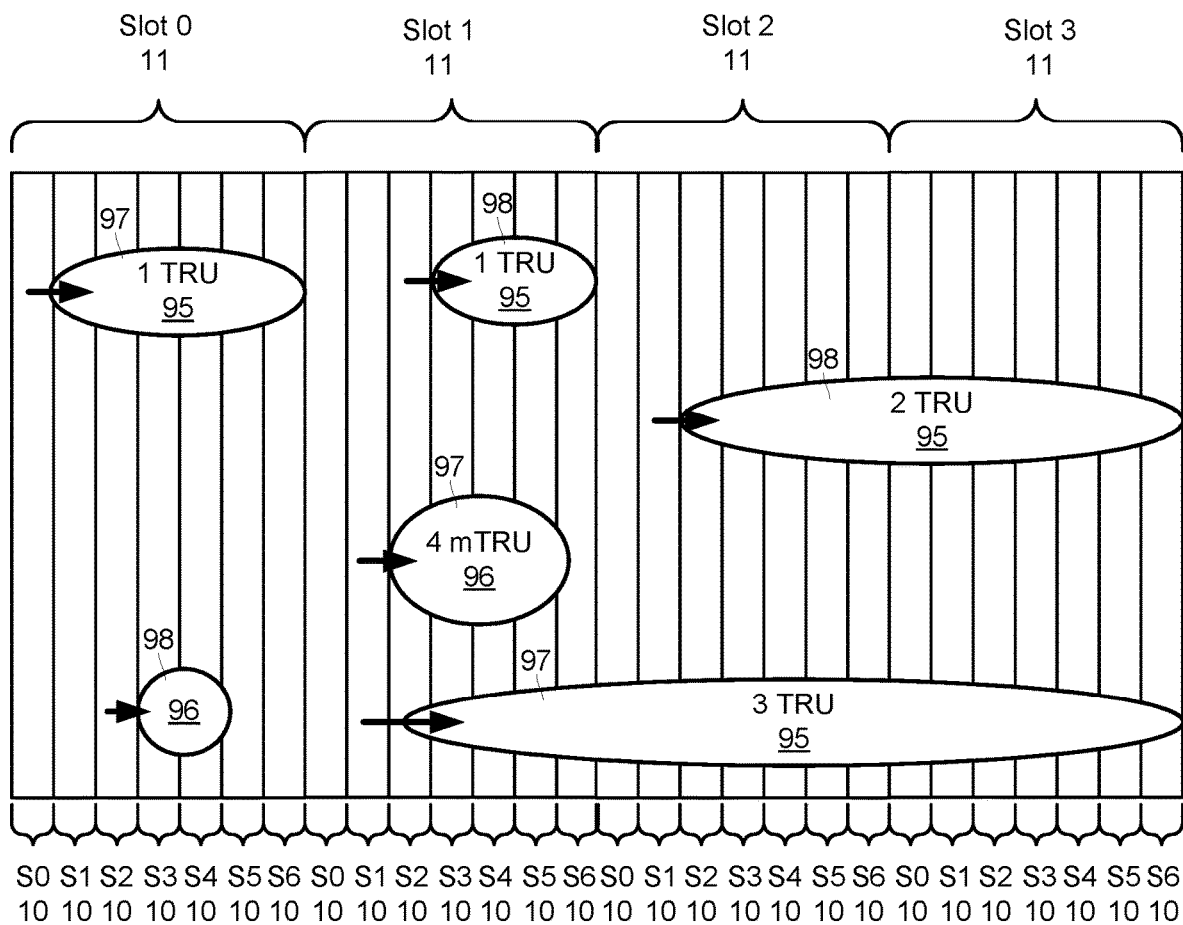
FIG. 10 is a schematic diagram illustrating one embodiment of time resource units and mini-time resource units.

In time domain, NR resources can be assigned in multiples of Time resource units (TRUs) 95 or mini-TRU 96. FIG. 10 illustrates TRU 95 and mini-TRU 96 that are scheduled via a slot transmission control 92/155 and scheduled via a mini-slot transmission control 93/150. TRUs 95 and mini-TRUs 95 may be characterized as shown.

UE can be assigned DL/UL resources in multiples of TRUs 95. 1TRU corresponds to all available OFDM symbols 10 within one slot 11.

For example, if the UE receives DL control in slot 1 indicating 3 TRUs 95 for DL reception, for determining its time-domain resource allocation, the UE determines that available OFDM symbols 10 in 3 slots starting from slot 1 (i.e., slots 1,2,3) are assigned to it for DL reception.

In one embodiment, UE can also be configured to receive mini-TRU based DL/UL resource assignments. One mini-TRU 95 can correspond to one OFDM symbol 10 in the numerology used for transmission. Alternately, one mini-TRU 96 can correspond another slightly larger value (e.g. 2 or 3 OFDM symbols 10)

FIG. 10 illustrates a few example resource allocations that are possible using TRU based and mini-TRU based resource allocation granularity, and also using slot based and mini-slot based DL control channel transmission. mini-slots and mini-TRUs need not be configured for all cases. However, they can be useful to serving UEs with latency critical traffic and also for operation in unlicensed spectrum especially for high load scenarios. While the figure illustrates DL resource allocations, same definitions are also applicable for uplink. However, for uplink, the time offset between the UL grant and the corresponding uplink transmission (TRU based or mini-TRU based) should also be signaled to the UE.

In frequency domain, similar to LTE, resources can be assigned using multiples of PRBs and PRB groups, where a PRB group consists of multiple PRBs (e.g. 4 PRBs or 8PRBs). PRB group size can be RRC configured.

Whether a given resource assignment is assigning resources with TRU granularity or with mini-TRU granularity can be indicated to the UE. This can be indicated explicitly, e.g. via a bit in the control information sent using the DL control channel or implicitly, e.g. using separate identifier (e.g. RNTI) or format for the DL control channels carrying TRU-based and mini-TRU based resource assignments.

Similarly, for frequency domain, whether a given resource assignment is assigning resources with PRB granularity or with PRB-group granularity can be indicated to the UE. This can be indicated explicitly, e.g. via a bit in the control information sent using the DL control channel or implicitly, e.g. using separate identifier (e.g. RNTI) or format for the DL control channels carrying PRB-based and PRB group based resource assignments.

Also, how the UE determines the number of available OFDM symbols within each assigned TRU can depend on whether the DL control channel is sent using slot based control (i.e., at a slot boundary) or whether it is sent using mini-slot based control (i.e., starting at an OFDM symbol that is not aligned with slot boundary).

Figure 11:
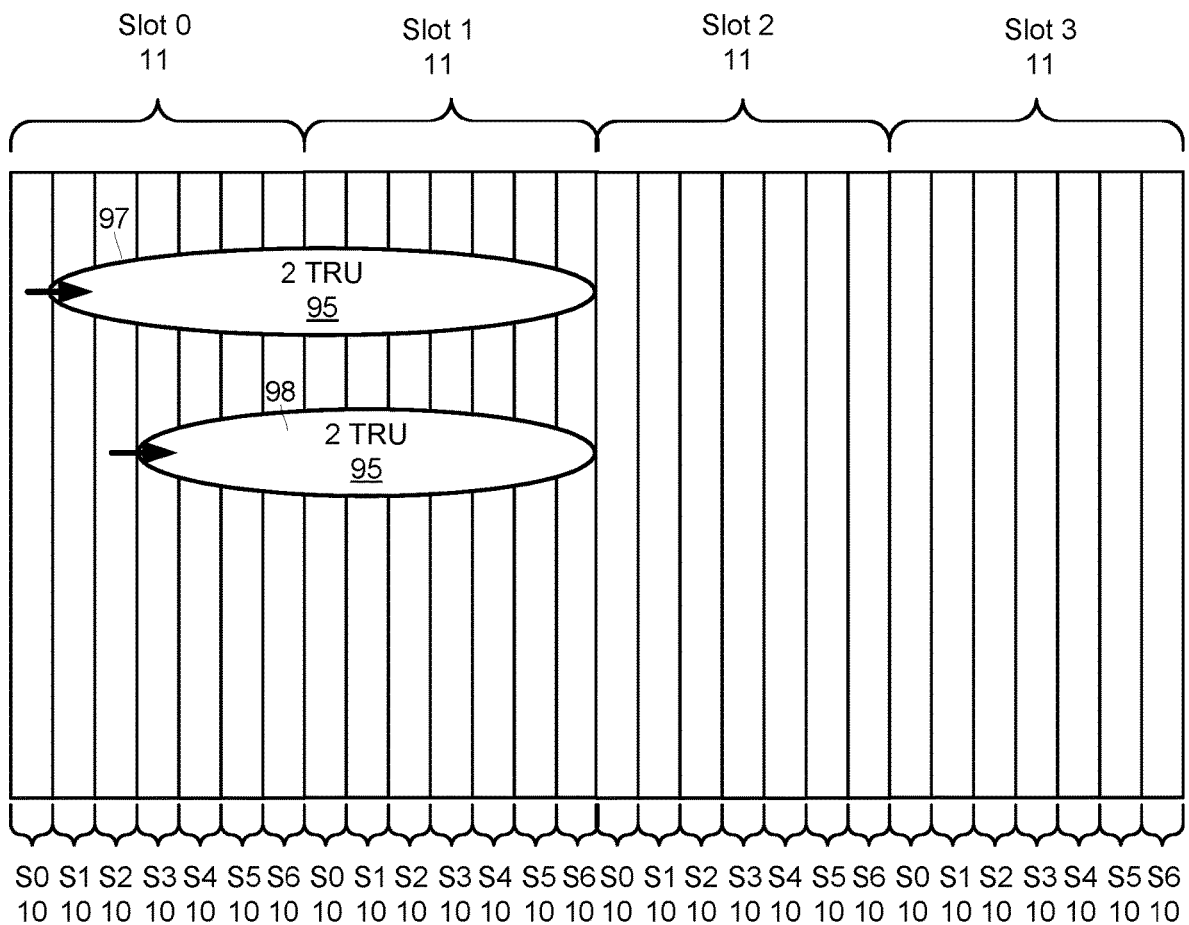
FIG. 11 is a schematic diagram illustrating one embodiment of time resource units.

For example, considering FIG. 11, if the DL control is received in the beginning of slot 0 11 (e.g. it is slot based DL control), and if it assigns 2 TRUs 95, the UE determines that OFDM symbols 1-6 10 are available in slot 0 (first assigned TRU) and all OFDM symbols 10 are available in slot 1 11 ($2^{nd}$ assigned TRU). However, if the DL control is received in OFDM symbol 2 10 of slot 0 11, and if it assigns 2 TRUs 95, the UE determines that OFDM symbols 3-6 10 are available in slot 0 11 (first assigned TRU 95) and all OFDM symbols 10 are available in slot 1 11 ($2^{nd}$ assigned TRU 95).

Figure 12:
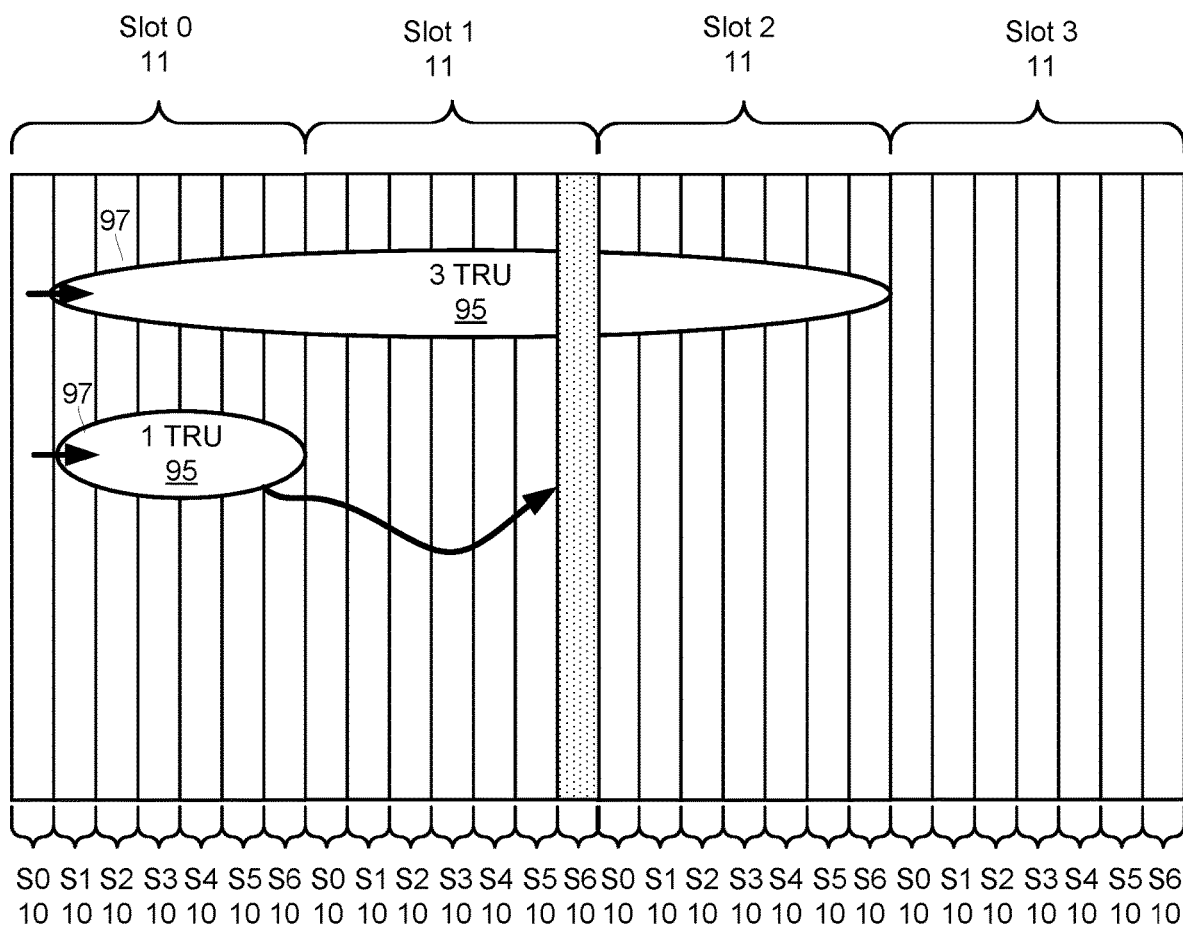
FIG. 12 is a schematic diagram illustrating one embodiment of time resource units.

In some cases, e.g., TDD systems, the UE also has to take into account presence of UL resources within a slot while determining the available OFDM symbols 10 of that slot 11 for DL reception. For example, considering FIG. 12, UE1 is assigned to receive 3TRUs 95 in via DL control in slot 0, UE2 is assigned to receive 1 TRU 95 in via DL control in slot 0. UE2 transmits the HARQ-ACK corresponding to its received data in the last symbol of slot 1 11. In this case, that symbol 10 (i.e., symbol 6 of slot 1) should be considered unavailable for DL data reception by UE1. One option to provide this information to UE1 is to include some bits in the DL control of UE1 using which the UE can determine the unavailable symbols 10 in the slot(s) corresponding to the assigned TRUs 95.

Figure 13:
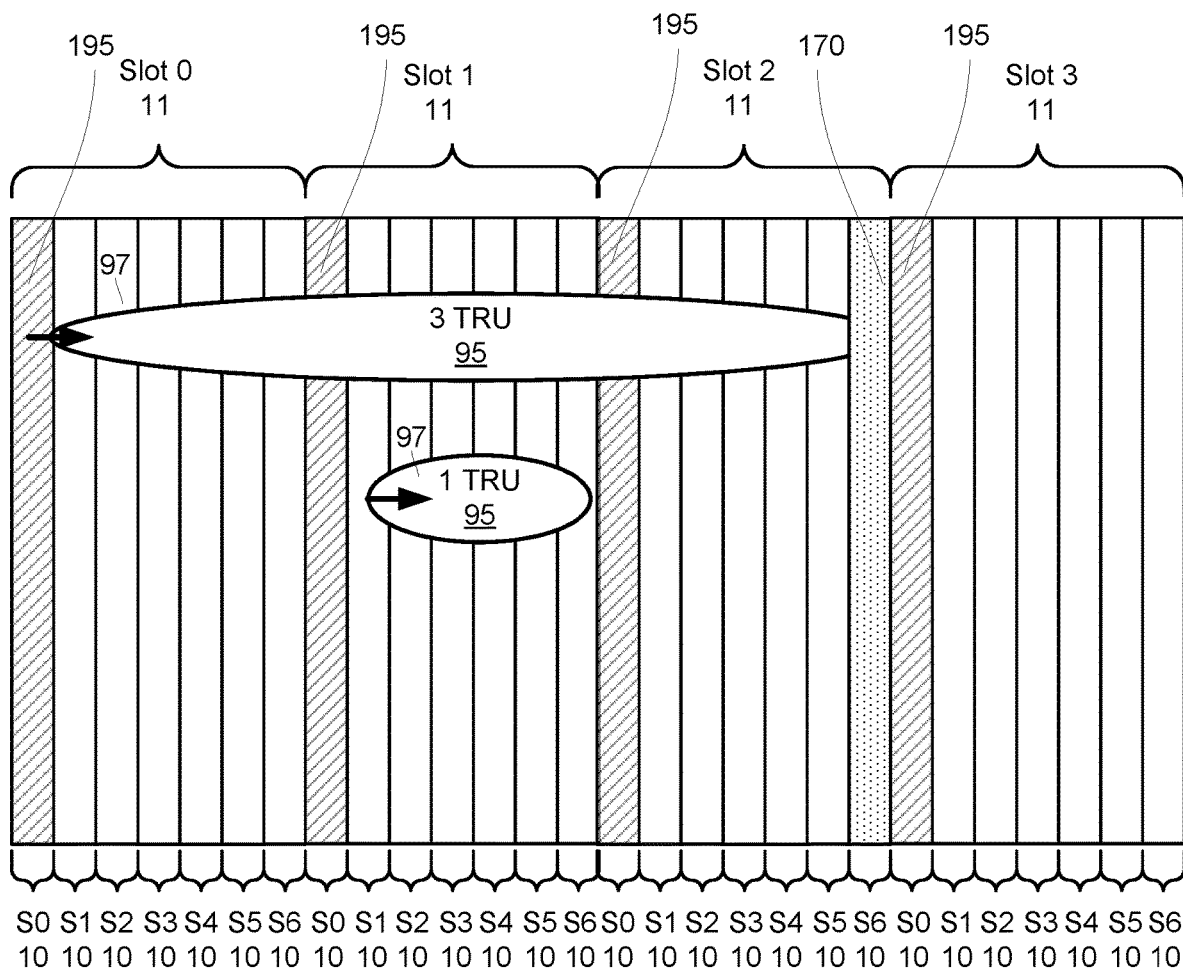
FIG. 13 is a schematic diagram illustrating one embodiment of time resource units.

However, it may not always be possible to indicate the unavailable symbols 10 of a resource assignment, in the corresponding DL control where that resource assignment is sent. For example, considering FIG. 13, UE1 is assigned to receive 3TRUs 95 in via DL control in slot 0 11, UE2 is assigned to receive 1 TRU 95 in via DL control in slot 1 11. UE2 transmits the HARQ-ACK corresponding to its received data in the last symbol 170 of slot 2 11. In this case, that symbol 170 (i.e., symbol 6 of slot 2) should be considered unavailable for DL data reception by UE1. However, since UE1's DL grant is sent before UE2's DL grant, it may not be possible to indicate that symbol 6 of slot 2 is unavailable in UE1's DL grant. One solution to address this issue is to make the UE read a "marker transmission" in each slot 11 corresponding to the TRUs assigned to the UE. The marker transmission can be sent typically in the beginning portion of each slot 11 and indicate the symbols used for UL in that slot 11. This is illustrated in FIG. 13 where the marker transmission is sent in first symbol 10 of every slot 11. Since the information sent in the marker transmission is rather small (e.g. a 5 or 6-bit bitmap to identify unavailable symbols), the frequency resources used for the marker transmission are expected to be rather limited. e.g. within the first symbol 10 of each slot 11, the marker can be sent is x PRBs (x may be 2, 4, 6 depending cell coverage etc.), where each PRB corresponds to 12 subcarriers.

In some examples, the "marker transmission" may not be present in all slots 11—UE assumes all the OFDM symbols 10 in the slot 11 are DL when the marker transmission is not detected. The marker transmission design has to be such that it has a very high detection probability when transmitted. In some examples, the marker transmission is sent on a common search space of a control channel with a marker specific RNTI. In case when the UE has scheduled UL transmission in a slot (portion of a slot), UE is not expected to receive a marker transmission indicating any of the UL symbols as not unavailable symbols. In one example of this case, the UE assumes the market transmission indicates the worst case unavailable symbols 10, i.e., maximum number of unavailable symbols 10. In another example of this case, the UE disregards the DL scheduling assignment and restores the HARQ soft buffer for the corresponding HARQ process to it was before it received the DL scheduling assignment, UE may also not transmit a HARQ-ACK feedback.

Transmission Time Interval

Another aspect to consider is the notion of transmission time interval (TTI). In one embodiment, a "TTI" typically refers to the duration in which the UE can receive/transmit a transport block (TB) 89 from higher layers (i.e., a MAC PDU from MAC layer). Therefore, TTI length depends on how TBs 89 are mapped to TRUs 95/mini-TRUs 96 assigned to the UE.

Figure 14:
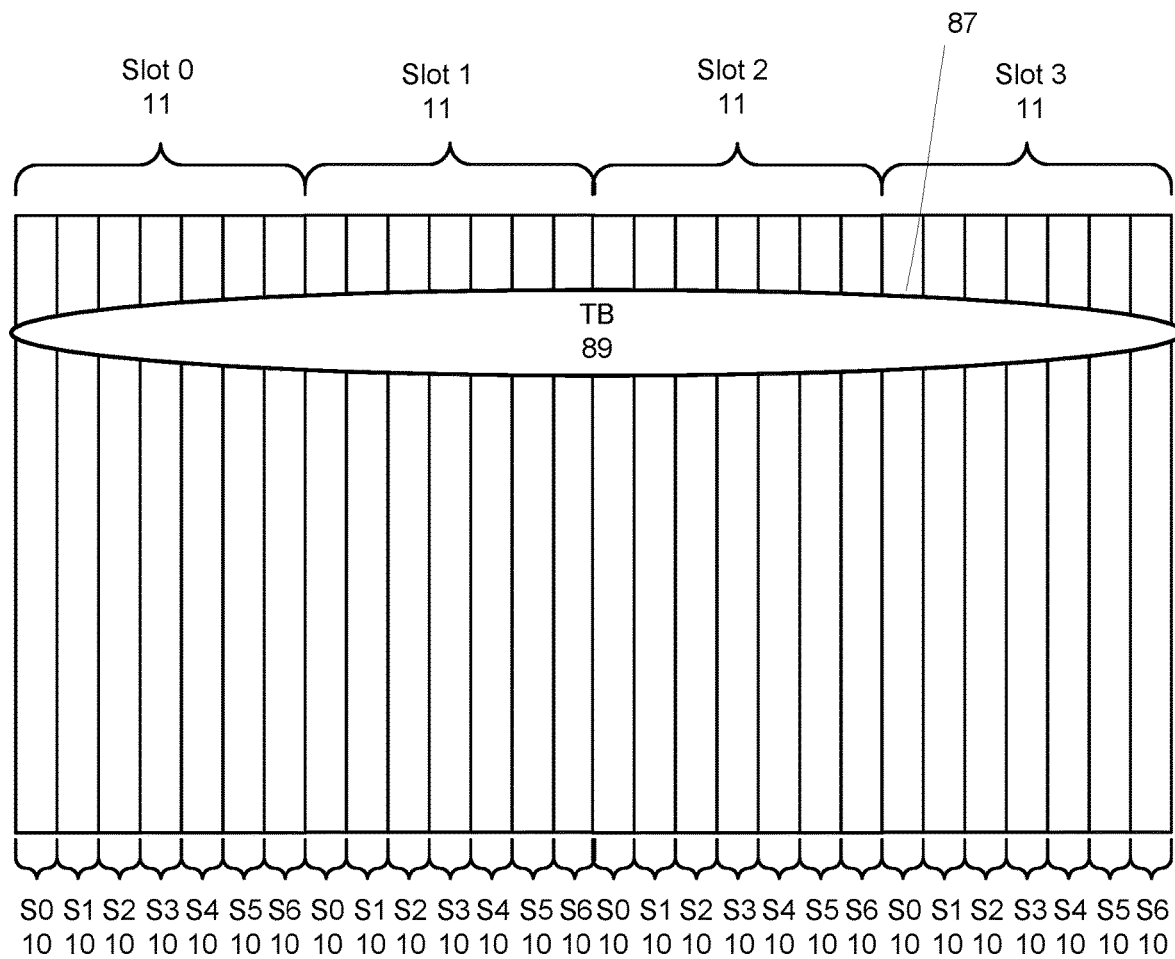
FIG. 14 is a schematic diagram illustrating one embodiment of a transport block data transmission within slots.

For example, the DL control can include control information and the following can be indicated as part of the control information:
  number of PRBs (# PRBs) assigned
  number of TRUs 95 (# TRUs) assigned
  MCS (Modulation and Coding Scheme)
  number of TBs 89 assigned (optional)
  based on this information UE can transmit/receive one or more transport blocks using one of the below approaches In one example, UE can use a formula or lookup table to determine a TB size for a given # PRBs, # TRUs and MCS combination and then assume that a single TB with that TB size is sent on the time frequency resources corresponding to the # PRBs and # TRUs allocation indicated in the control information. In this case, TTI duration for the TB 89 is given by the duration of all indicated TRUs 95. FIG. 14 shows an example for this case.

In another example, UE can use a formula or lookup table to determine a TB size for a given # PRBs and MCS combination, and then assume that a multiple TBs 89 with that TB size (e.g. one TB for each TRU 95 in the # TRUs indicated) are sent on the time frequency resources corresponding to the # PRBs and # TRUs allocation indicated in the control information 87. The multiple TBs can include repetition of one or more TBs.

Figure 15:
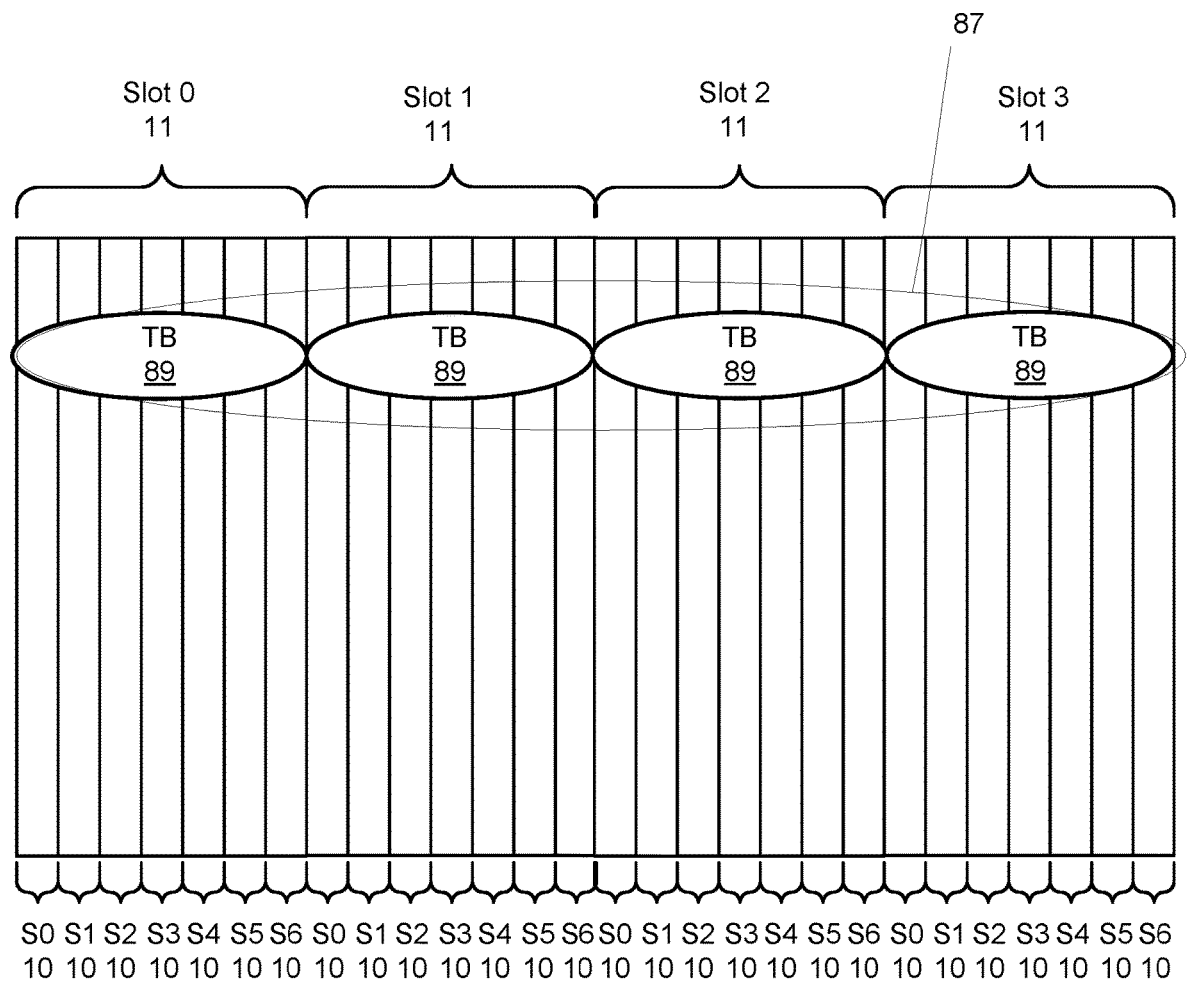
FIG. 15 is a schematic diagram illustrating one embodiment of transport blocks data transmission within slots.

In this case, TTI duration for each TB 89 is given by the duration of each TRU 95 on which the TB 89 is sent. FIG. 15 shows an example for this case.

Figure 16:
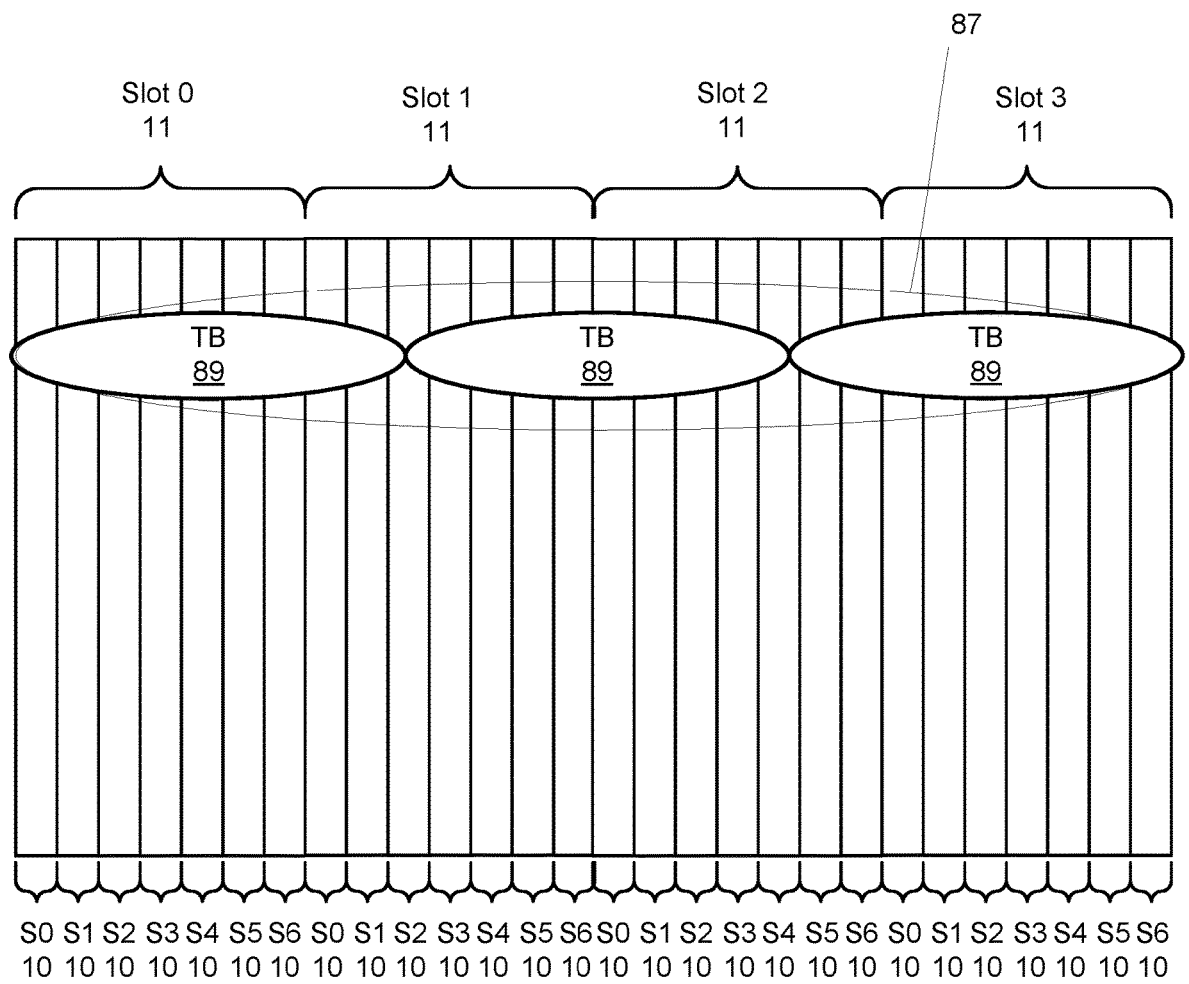
FIG. 16 is a schematic diagram illustrating one embodiment of transport blocks data transmission within slots.

If number of TBs 89 assigned is also included as part of control information, and it indicates x TBs, UE can use a formula or lookup table to determine a TB size for a given # PRBs and MCS combination, and then transmit/receive x TBs with the determined TB size on the time frequency resources corresponding to the # PRBs and # TRUs allocation indicated in the control information. In this case, it is possible that transmission of some of the TBs can start in one slot corresponding to a first allocated TRU 95 and end in the middle of a later slot corresponding to a later allocated TRU 95 later than the first allocated TRU 95. FIG. 16 shows an example for this case.

In another example, the DL control can include control information and the following can be indicated as part of the control information:
  number of PRBs (# PRBs) assigned
  number of TRUs 95 (# TRUs) assigned
  TB index (corresponding to a TB size)
  number of TBs 89 assigned (optional)
  based on this information UE can transmit/receive one or more transport blocks using one of the below approaches In one example, UE can determine a transport block size from the TB index value, and a transmit/receive a single TB 89 (e.g. similar to FIG. 14) with that TB size on the time frequency resources corresponding to the # PRBs and # TRUs allocation indicated in the control information. UE can use a formula or look up table to determine the MCS value used for transmission/reception of the transport block for a given TB size, # PRBs and # TRUs combination.

In another example, UE can determine a transport block size from the TB index value, and a transmit/receive multiple TBs (e.g. one TB for each TRU in the # TRUs indicated as shown in FIG. 15) with that TB size on the time frequency resources corresponding to the # PRBs and # TRUs allocation indicated in the control information. UE can use a formula or look up table to determine the MCS value used for transmission/reception of the transport block for a given TB size, # PRBs combination.

If number of TBs 89 (# TBs) assigned is also included as part of control information, and it indicates x TBs, UE can determine a transport block size from the TB index value, and then transmit/receive x TBs with the determined TB size on the time frequency resources corresponding to the # PRBs and # TRUs allocation indicated in the control information. In this case, it is possible that transmission of some of the TBs can start in one slot corresponding to a first allocated TRU 95 and end in the middle of a later slot corresponding to a later allocated TRU 95 later than the first allocated TRU 95. UE can use a formula or look up table to determine the MCS value used for transmission/reception of the transport block for a given TB size, # PRBs, # TRUs, # TBs combination.

In the examples discussed above, the control information in the transmission control 93 may include a number of mini-TRUs 96 (# mini-TRUs) instead of # TRUs. In that case, UE can use # mini-TRUs value in place of # TRUs. In the examples discussed above, the control information may include a number of PRB groups (# PRB-groups) instead of # PRBs. In that case, UE can # PRB-groups value in place of # PRBs.

UL Resources and Reserved Resources

In one embodiment, the system should support an operation mode where (time domain) resources reserved for UL are semi-statically indicated to the UE. Similar to semi-static reservation of UL resources, it should also be possible to semi-statically reserve time domain resources for other transmissions such as sidelink transmissions or backhaul transmissions. From a DL reception perspective, the UE can consider OFDM symbols 10 corresponding to reserved resources (for UL or other purposes) are considered as unavailable for DL data transmission if the assigned TRUs for the UE overlap the reserved resources.

Another flexible and forward compatible approach for supporting UL transmissions is to let UE determine its UL transmission resources based on information received in L1 DL control signaling.

For UL data transmission, TRUs 95/mini-TRUs 96 that the UE should use can be signaled in the UL grant along with the time offset between the UL grant and the allocated TRUs.

For UL HARQ-ACK transmission (in response to DL data), considering the support for multi-TRU and mini-TRU allocations, the timing for HARQ-ACK depends on the end point of DL data transmission and time-frequency mapping of the DL TBs. Also, the number of TRUs 95/mini-TRUs 96 required for HARQ-ACK transmission depends on several factors including UE coverage and latency requirements.

Considering these aspects, the system should also support an operation mode where no UL resources are pre-reserved using semi-static signaling.

Multiple Numerologies Per Carrier and Across Carriers

A UE may be configured to monitor the slot and mini-slot occurrences (e.g. attempt to decode slot based DL control and/or mini-slot based DL control) in different frequency regions of a carrier in a given time interval with each frequency region having its own numerology and subcarrier spacing.

Also, a UE may be configured to monitor the slot and mini-slot occurrences (e.g. attempt to decode slot-based DL control and/or mini-slot based DL control) in different frequency regions in each carrier over multiple carriers in a given time interval with each frequency region having its own numerology and subcarrier spacing.

To reduce complexity, the UE may be configured to only monitor a subset of all possible slot and mini-slot occurrences in each frequency region to reduce the overall required control and data decoding attempts for the given time interval.

In one embodiment, DCI format of the DL control provides a compressed resource allocation indication for narrow band allocation. The UE configured to monitor control channel with a first dedicated control channel indicator format. The first dedicated control channel indicator format including an indication of a sub-band starting position. In one embodiment the UE is provided with resource allocation within a sub-portion of the wideband channel and the DCI indicates which sub-band this is.

In another embodiment, resource allocation can begin in any slot 11 and in any mini-slot location of the indicated slot. The control channel indicator can include the starting slot location for allocation. The Control channel indicator includes the starting slot location for allocation (so UE can receive control channel in slot other than the beginning slot of allocation).

In one embodiment, aggregation of DL control resources across mini-slots is configured to determine the downlink control information.

In another embodiment of receiving control channel information, the receiving control the control channel information can further include a frequency diverse allocation field consisting of a single bit indicating frequency diverse allocations for the resource assignments; the frequency diverse allocation determined by one or more of the resource allocation fields, a priori information, and using signaling other than the control channel, the a priori information comprising the contents of a look-up table the signaling other than the control channel comprises high layer signaling to indicate which sub-frames of the continuum of concatenated sub-frames are included in the frequency diverse allocation. In one example, the plurality of resource allocation fields indicating a resource assignment to the wireless communication device.

In one embodiment, UE may be configured to monitor first mini-slot of slot or every mini-slot of slot. The resource allocation information indicates the Start of the first mini-slot, number of slots or it could be a fixed number of mini-slots from the mini-slot containing the PDCCH providing resource allocation.

In another embodiment, the Resource allocation information can indicate the number of slots for which the allocation is valid, including the number of mini-slots in the last slot of allocation. In this case the resource allocation or time resource unit need not align with the end of the slot boundary.

Additional Embodiments

1. A method in a wireless communication device, the method comprising:
receiving a plurality of slots forming a continuum of concatenated slots, each slot having time-frequency resource elements,
each slot further composed of a first number of OFDM symbols,
the wireless communication device configured to monitor for control channel (at least in the first symbol of each slot
decoding a control channel assigned to the UE and receiving control channel information allocating resources to the UE for receiving data
determining the time resource units in the decoded control channel information
determining the available OFDM symbols in the slots associated with the time resource units based on the symbol location in which the control channel is received
receiving data based on the resource allocation in the decoded control channel and the available OFDM symbols.

1a. The method in claim 1, receiving a plurality of slots further comprising, the slot includes a continuum of mini-slots, a mini-slot composed of a second number of OFDM symbols, the second number is less than the first number of OFDM symbols 1b. The method of claim 1a further comprising, configuring the communication device to monitor the first symbol of each mini-slot 2. Method of claim 1 where the UE Is configured to monitor the first symbol of a sub-set of slots, the subset of slots not including every slot in the continuum of slots 2a. Method of claim 1b where the UE Is configured to monitor the first symbol of a sub-set of mini-slots, the subset of mini-slots not including every mini-slot in the continuum of mini-slots 3. the method of claim 1 including
receiving control channel information including the location (identity of symbols) of uplink resources that overlap the time resource units assigned to the UE
Determining the available OFDM symbols based on the location of uplink resource and the length of the time resource units
receiving data based in the resource allocation in the decoded control channel and the available OFDM symbols.

4. the method of claim 1 including
Receiving marker information in the first symbol of every slot
the marker information including, identity of symbols used for (or presence or lack thereof) of uplink resources in the corresponding slot
Determining the available OFDM symbols based on the identity of symbols used for uplink resource, the determining including removing the symbols used for uplink resource from the available OFDM symbols
receiving data based in the resource allocation in the decoded control channel and the available OFDM symbols.

5. A method in a wireless communication device or UE, the method comprising receiving a configuration message, the configuration message configuring the UE to monitor on a first carrier a first subset of slot and mini-slot occasions, and further configuring the UE to monitor on a second carrier a second subset of slot and mini-slot occasions wherein each slot occasion comprises a first number of OFDM symbol durations and each mini-slot occasion comprises a second number of OFDM symbol durations and the second number is smaller than the first number.

6. The method of claim 5, where first subset of slot and mini-slots occasions correspond to a first numerology and sub-carrier spacing and the second subset of slot and mini-slot occasions correspond to a second numerology and subcarrier spacing.

7. A method in a wireless communication device or UE, the method comprising receiving a configuration message, the configuration message configuring the UE to monitor in each frequency region of a plurality of frequency regions, a subset of available slot and mini-slot occasions wherein each slot occasion comprises a first number of OFDM symbol durations and each mini-slot occasion comprises a second number of OFDM symbol durations and the second number is smaller than the first number, where the plurality of frequency regions may be in one carrier or mapped to more than one carrier.

8. The method of claim 7, where each subset of slot and mini-slots occasions corresponds to a different numerology and sub-carrier spacing.

1 An apparatus comprising:
a processor that performs;
monitoring for a transmission control in a given Orthogonal Frequency-Division Multiplexing (OFDM) symbol of a first slot based on a transmission control policy;
receiving the transmission control in the given OFDM symbol;
determining available time frequency resources (TFR) for a data transmission based on at least a symbol position of the given OFDM symbol and the transmission control policy, wherein the TFR comprise at least one OFDM symbol and at least one frequency range; and
communicating the data transmission in the TFR.

2 The apparatus of claim 1, wherein the transmission control is one of a downlink control for a downlink data transmission to a mobile device and an uplink control for an uplink data transmission to a base station.

3 The apparatus of claim 1, wherein the transmission control policy specifies that the symbol position of the given OFDM symbol is OFDM symbol 0 for a slot transmission control, the symbol position is of one or more of OFDM symbols 1-13 for a 14-symbol mini-slot transmission control, and the symbol position is one or more of OFDM symbols 1-6 for a seven-symbol mini-slot transmission control.

4 The apparatus of claim 1, wherein the transmission control policy specifies that the symbol position of the given OFDM symbol is OFDM symbols 0-1 for a slot transmission control, the symbol position of the given OFDM symbol is selected from the group of consisting of OFDM symbol 2, OFDM symbol 4, OFDM symbol 6, OFDM symbol 8, OFDM symbol 10, and OFDM symbol 12 for a 14-symbol mini-slot transmission control, and the symbol position of the given OFDM symbol is selected from the group of consisting of OFDM symbol 2, OFDM symbol 4, and OFDM symbol 6 for a seven-symbol mini-slot transmission control.

5 The apparatus of claim 1, wherein the transmission control policy specifies that the symbol position of the given OFDM symbol is OFDM symbols 0-1 for a slot transmission control, the symbol position of the given OFDM symbol is one or more of OFDM symbols 1-6 for a seven-symbol mini-slot transmission control, and the symbol position of the given OFDM symbol is one or more of OFDM symbols 1-13 for a 14-symbol mini-slot transmission control, wherein a slot type indicator determines whether the transmission control in OFDM symbol 1 is a slot transmission control 155 or a mini-slot transmission control.

6 The apparatus of claim 1, wherein the transmission control policy specifies that the symbol position of the given OFDM symbol is OFDM symbols 0-2 for a slot transmission control, the symbol position of the given OFDM symbol is one or more of OFDM symbols 1-13 for a 14-symbol mini-slot transmission control, and the symbol position of the given OFDM symbol is one or more of OFDM symbols 1-6 for a seven-symbol mini-slot transmission control, wherein a slot type indicator determines whether the transmission control in OFDM symbols 1 and 2 is a slot transmission control or a mini-slot transmission control.

7 The apparatus of claim 1, wherein the transmission control policy specifies that the symbol position of the given OFDM symbol is OFDM symbols 0-2 for a slot transmission control, the symbol position of the given OFDM symbol is selected from the group of consisting of OFDM symbol 2, OFDM symbol 4, OFDM symbol 6, OFDM symbol 8, OFDM symbol 10, and OFDM symbol 12 for a 14-symbol mini-slot transmission control, and the symbol position of the given OFDM symbol is selected from the group of consisting of OFDM symbol 2, OFDM symbol 4, and OFDM symbol 6 for a seven-symbol mini-slot transmission control, wherein a slot type indicator determines whether the transmission control in OFDM symbol 2 is a slot transmission control or a mini-slot transmission control.

8 The apparatus of claim 1, wherein the given OFDM symbol comprises a mini-slot transmission control and 0 to 12 immediately subsequent OFDM symbols comprise a mini-slot.

9 The apparatus of claim 1, wherein the transmission control is received at a specified set of OFDM symbols and frequency regions and is received no more than once each slot in the given OFDM symbol.

10 The apparatus of claim 1, wherein a first TFR of the TFR starts at an OFDM symbol immediately following the given OFDM symbol and ends at OFDM symbol 13 of a 14-symbol slot and ends at OFDM symbol 6 of a seven-symbol slot.

11 The apparatus of claim 10, wherein the transmission control comprises a TFR number that specifies a number of TFR in the data transmission and wherein for a given TFR number that is greater than one, the TFR end at a last OFDM symbol of a slot subsequent to the first slot and wherein the TFR comprise the TFR number of TFR transmitted in the number of TFR slots.

12 The apparatus of claim 1, wherein the TFR is a mini-TFR that starts at an OFDM symbol immediately following the given OFDM symbol and comprises 2 to 12 OFDM symbols.

13 The apparatus of claim 12, wherein the mini-TFR is embodied within a mini-slot.

14 The apparatus of claim 1, wherein the transmission control comprises a modulation encoding scheme (MCS) index that specifies a modulation scheme and an encoding rate and the TFR are determined based on the modulation scheme and the encoding rate.

15 The apparatus of claim 12, the transmission control further comprising a starting slot indicator that specifies an initial slot for the data transmission.

16 The apparatus of claim 1, wherein the processor further performs:
receiving a resource marker that indicates a reserved OFDM symbol; and
omitting TFR in the reserved OFDM symbol.

17 The apparatus of claim 16, wherein the reserved resources marker 195 comprises a reserved resources bitmap with a bit set for each reserved OFDM symbol in one or more slots.

18 The apparatus of claim 16, wherein each reserved OFDM symbol is reserved for one or more of an uplink communication, a side link communication and a back-off communication.

Problem/Solution

Radio frequency bandwidths are valuable. As a result, it is advantageous to minimize the use of bandwidth. The embodiments described herein employ mini slots 17 to reduce the bandwidth resources required in communications between the base station 120 and a mobile device 110. In addition, the embodiments determine available TFR 16 for a data transmission based at least in part on the symbol position 203 of a given OFDM symbol 10 that carries the transmission control 150/155. As a result, transmission control data bits may be conserved.

Embodiments may be practiced in other specific forms. The described may be performed by a processor. Embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
monitoring, by use of a processor, for a transmission control in a given Orthogonal Frequency-Division Multiplexing (OFDM) symbol of a first slot based on a transmission control policy, wherein the transmission control policy specifies that the symbol position of the given OFDM symbol is only OFDM symbol 4 for a seven-symbol mini-slot transmission control, wherein the transmission control is an uplink control or a downlink control;
receiving the transmission control in the given OFDM symbol;
receiving information including symbol position of uplink resources that overlap with a time frequency resources (TFR);
determining available TFR for a data transmission based on at least a symbol position of the given OFDM symbol, the transmission control, and the symbol position of the uplink resources that overlap with the TFR, wherein the TFR comprise at least one OFDM symbol and at least one frequency range; and
communicating the data transmission in the TFR.

2. The method of claim 1, wherein the transmission control is the downlink control for a downlink data transmission to a mobile device and the uplink control for an uplink data transmission to a base station.

3. The method of claim 1, wherein the given OFDM symbol comprises a mini-slot transmission control and 0 to 12 immediately subsequent OFDM symbols comprise a mini-slot.

4. The method of claim 1, wherein the transmission control is received at a specified set of OFDM symbols and frequency regions and is received no more than once each slot in the given OFDM symbol.

5. The method of claim 1, wherein a first TFR of the TFR starts at an OFDM symbol 10 immediately following the given OFDM symbol and ends at OFDM symbol 13 of a 14-symbol slot and ends at OFDM symbol 6 of a seven-symbol slot.

6. The method of claim 5, wherein the transmission control comprises a TFR number that specifies a number of TFR in the data transmission and wherein for a given TFR number that is greater than one, the TFR end at a last OFDM symbol of a slot subsequent to the first slot and wherein the TFR comprise the TFR number of TFR transmitted in the number of TFR slots.

7. The method of claim 1, wherein the TFR is a mini-TFR that starts at an OFDM symbol immediately following the given OFDM symbol and comprises 2 to 12 OFDM symbols.

8. The method of claim 7, wherein the mini-TFR is embodied within a mini-slot.

9. The method of claim 1, wherein the transmission control comprises a modulation encoding scheme (MCS) index that specifies a modulation scheme and an encoding rate and the TFR are determined based on the modulation scheme and the encoding rate.

10. The method of claim 7, the transmission control further comprising a starting slot indicator that specifies an initial slot for the data transmission.

11. The method of claim 1, the method further comprising:
receiving a resource marker that indicates a reserved OFDM symbol; and
omitting TFR in the reserved OFDM symbol.

12. The method of claim 11, wherein the reserved resources marker comprises a reserved resources bitmap with a bit set for each reserved OFDM symbol in one or more slots.

13. The method of claim 11, wherein each reserved OFDM symbol is reserved for one or more of an uplink communication, a side link communication and a back-off communication.

14. An apparatus comprising:
a processor that performs;
monitoring for a transmission control in a given Orthogonal Frequency-Division Multiplexing (OFDM) symbol of a first slot based on a transmission control policy, wherein the transmission control policy specifies that the symbol position of the given OFDM symbol is only OFDM symbol 4 for a seven-symbol mini-slot transmission control, wherein the transmission control is an uplink control or a downlink control;
receiving the transmission control in the given OFDM symbol;
receiving information including symbol position of uplink resources that overlap with a time frequency resources (TFR);
determining available TFR for a data transmission based on at least a symbol position of the given OFDM symbol, the transmission control, and the symbol position of the uplink resources that overlap with the TFR, wherein the TFR comprise at least one OFDM symbol and at least one frequency range; and
communicating the data transmission in the TFR.

15. A program product comprising a non-transitory computer readable storage medium storing code executable by a processor to perform:
monitoring for a transmission control in a given Orthogonal Frequency-Division Multiplexing (OFDM) symbol of a first slot based on a transmission control policy, wherein the transmission control policy specifies that the symbol position of the given OFDM symbol is only OFDM symbol 4 for a seven-symbol mini-slot transmission control, wherein the transmission control is an uplink control or a downlink control;
receiving the transmission control in the given OFDM symbol;
receiving information including symbol position of uplink resources that overlap with a time frequency resources (TFR);
determining available TFR for a data transmission based on at least a symbol position of the given OFDM symbol, the transmission control, and the symbol position of the uplink resources that overlap with the TFR, wherein the TFR comprise at least one OFDM symbol and at least one frequency range; and
communicating the data transmission in the TFR.

16. The method of claim 1, wherein the transmission control policy further specifies monitoring for transmission control in the given OFDM symbol on a sub-set of mini-slots of a plurality of min-slots forming a continuum of concatenated mini-slots.

17. The method of claim 1, wherein the transmission control comprises a modulation encoding scheme (MCS) index that specifies a modulation scheme and an encoding rate and further comprises determining, by use of a formula, a transport block size (TBS) of a transport block (TB) of the data transmission based on the TFR, the modulation scheme and the encoding rate.

18. The method of claim 17, wherein the transmission control comprises a TFR number that specifies a number of TFR in the data transmission and wherein for a given TFR number that is greater than one, the transport block with the determined transport block size is mapped on the time frequency resources corresponding to the TFR number of TFR indicated in the transmission control.

19. The method of claim 17, wherein the transmission control comprises a TFR number that specifies a number of TFR in the data transmission and wherein for a given TFR number that is greater than one, each of a plurality of transport blocks with the determined transport block size is mapped on the time frequency resources corresponding to each of the TFR number of TFR indicated in the transmission control.

* * * * *